United States Patent
Wu et al.

(10) Patent No.: US 10,717,492 B1
(45) Date of Patent: Jul. 21, 2020

(54) FOLDABLE VEHICLE

(71) Applicant: Smacircle LMT, Ltd., Shenzhen, Guangdong Province (CN)

(72) Inventors: Shanggui Wu, Shenzhen (CN); Joseph Lin, Torrance, CA (US); Luyao Zhuang, Shenzhen (CN); Zhaozhi Zhang, Shenzhen (CN); Ming Li, Shenzhen (CN)

(73) Assignee: Smacircle LMT Ltd., Shenzhen (CN)

( * ) Notice: Subject to any disclaimer, the term of this patent is extended or adjusted under 35 U.S.C. 154(b) by 0 days.

(21) Appl. No.: 16/791,186

(22) Filed: Feb. 14, 2020

Related U.S. Application Data

(63) Continuation of application No. 16/265,442, filed on Feb. 1, 2019, now Pat. No. 10,569,821.

(51) Int. Cl.
| | |
|---|---|
| *B62J 1/08* | (2006.01) |
| *B62K 15/00* | (2006.01) |
| *B62K 21/12* | (2006.01) |
| *B62J 99/00* | (2020.01) |
| *B62J 45/00* | (2020.01) |

(52) U.S. Cl.
CPC ............... *B62K 15/008* (2013.01); *B62J 1/08* (2013.01); *B62J 99/00* (2013.01); *B62K 21/12* (2013.01); *B62J 45/00* (2020.02); *B62K 2204/00* (2013.01)

(58) Field of Classification Search
CPC .. B62K 15/008; B62K 99/00; B62K 2204/00; B62J 1/08; B62J 2099/004
See application file for complete search history.

(56) References Cited

U.S. PATENT DOCUMENTS

| | | | |
|---|---|---|---|
| 2015/0321722 A1* | 11/2015 | Dadoosh | B60L 53/14 180/208 |
| 2017/0247076 A1* | 8/2017 | Uimonen | B62K 3/02 |

\* cited by examiner

*Primary Examiner* — John D Walters
*Assistant Examiner* — James J Triggs
(74) *Attorney, Agent, or Firm* — Raymond Sun

(57) ABSTRACT

A foldable vehicle includes a front wheel frame having a front wheel pivotably connected thereto, the front wheel frame having a front circular opening for receiving the front wheel. The vehicle also has a rear wheel frame having a rear wheel pivotably connected thereto, the rear wheel frame having a rear circular opening for receiving the rear wheel. A pivot joint connects the front wheel frame and the rear wheel frame, with the front wheel frame and the rear wheel frame being pivotable against each other via the pivot joint. A front vertical support extends from the front wheel frame and has a handlebar assembly pivotably secured to the front vertical support, and a rear vertical support extends from the rear wheel frame and has a seat assembly removably secured to the rear vertical support.

12 Claims, 26 Drawing Sheets

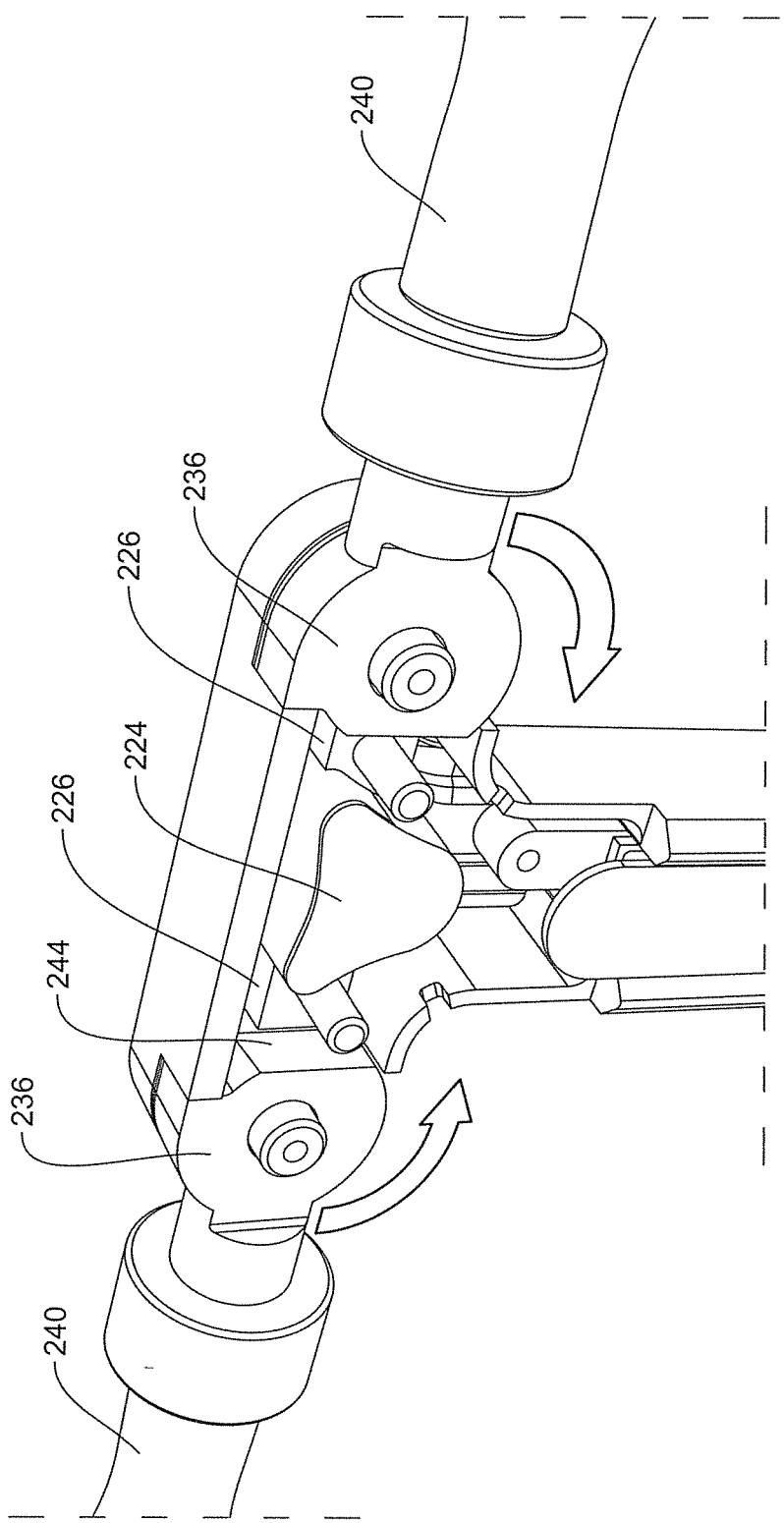

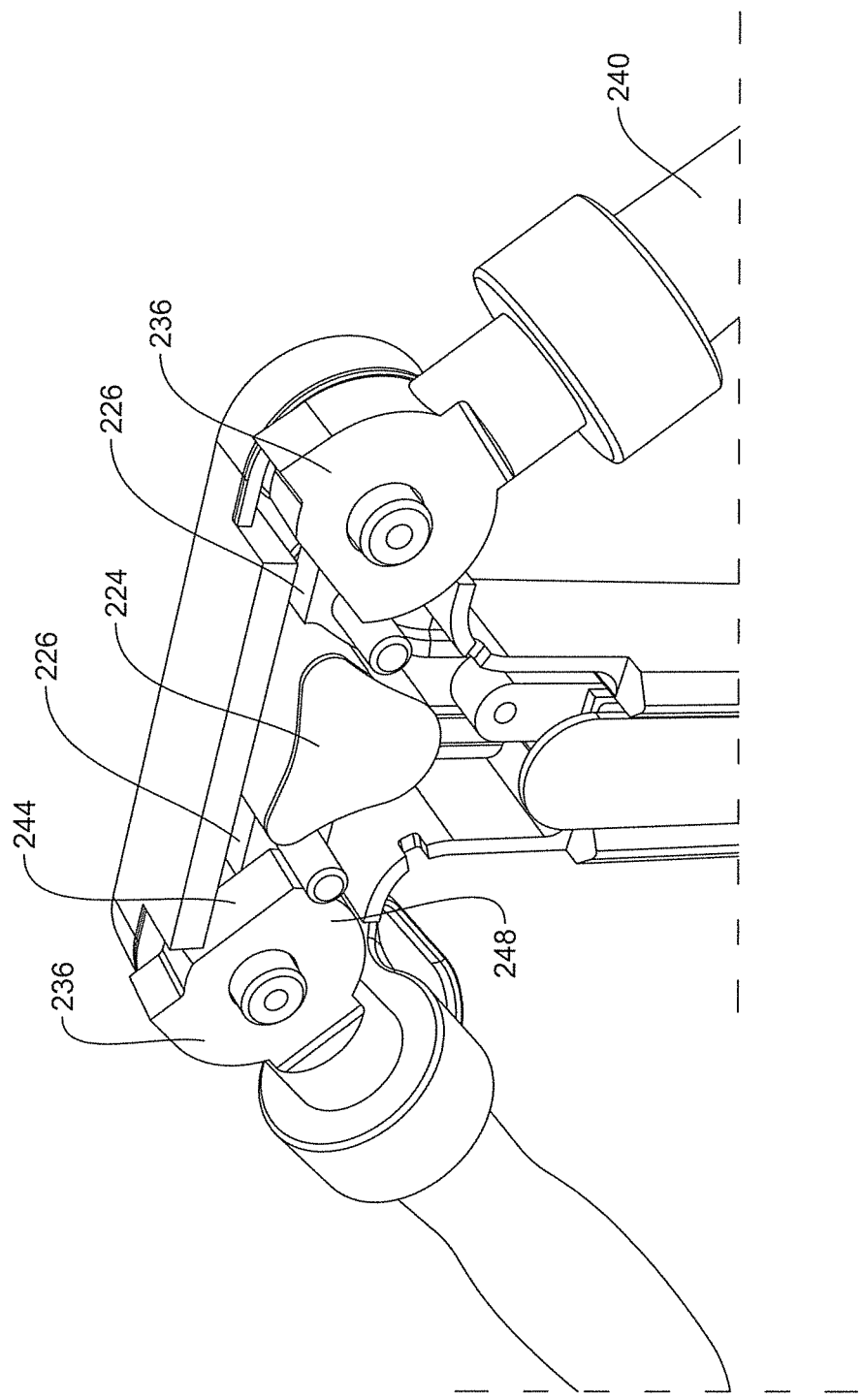

FOLDABLE VEHICLE

BACKGROUND OF THE INVENTION

1. Field of the Invention

The present invention generally relates to foldable vehicles, and in particular, to bicycles and scooters that can be folded to reduce the overall size of the vehicle.

2. Description of the Prior Art

As living standards improve, people's lives have increasingly diverse needs, which often call for short-distance travel in dense urban cities. In many of these situations, having a car is simply not convenient, either because parking can be difficult to find, or because many people living in large metropolitan cities such as Shanghai and Tokyo do not even own cars. Therefore, it is important that vehicles be developed for convenient and effective urban short-distance travel.

Bicycles and scooters are commonly used by people in urban areas, but because these vehicles are bulky, they still need to be parked, and cannot be carried around conveniently. For example, it can be very inconvenient to carry a bicycle into a crowded subway train.

Thus, there still remains a need for a portable vehicle that can be used for urban short-distance travel, and which is easy to carry around.

SUMMARY OF THE DISCLOSURE

It is an object of the present invention to provide a portable vehicle that can be used for urban short-distance travel, and which is easy to carry around and to store.

It is another object of the present invention to provide a portable vehicle that can be folded into a size that is small enough so that it can stored in a backpack.

In order to accomplish the objects of the present invention, a foldable vehicle is provided, having a front wheel frame having a front wheel pivotably connected thereto, the front wheel frame having a front circular opening for receiving the front wheel. The vehicle further includes a rear wheel frame having a rear wheel pivotably connected thereto, the rear wheel frame having a rear circular opening for receiving the rear wheel. A pivot joint connects the front wheel frame and the rear wheel frame, with the front wheel frame and the rear wheel frame being pivotable against each other via the pivot joint. A front vertical support extends from the front wheel frame and has a handlebar assembly pivotably secured to the front vertical support, and a rear vertical support extends from the rear wheel frame and has a seat assembly removably secured to the rear vertical support.

BRIEF DESCRIPTION OF THE DRAWINGS

FIGS. 7A-7C illustrate the operation of the handlebar assembly of FIG. 3.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
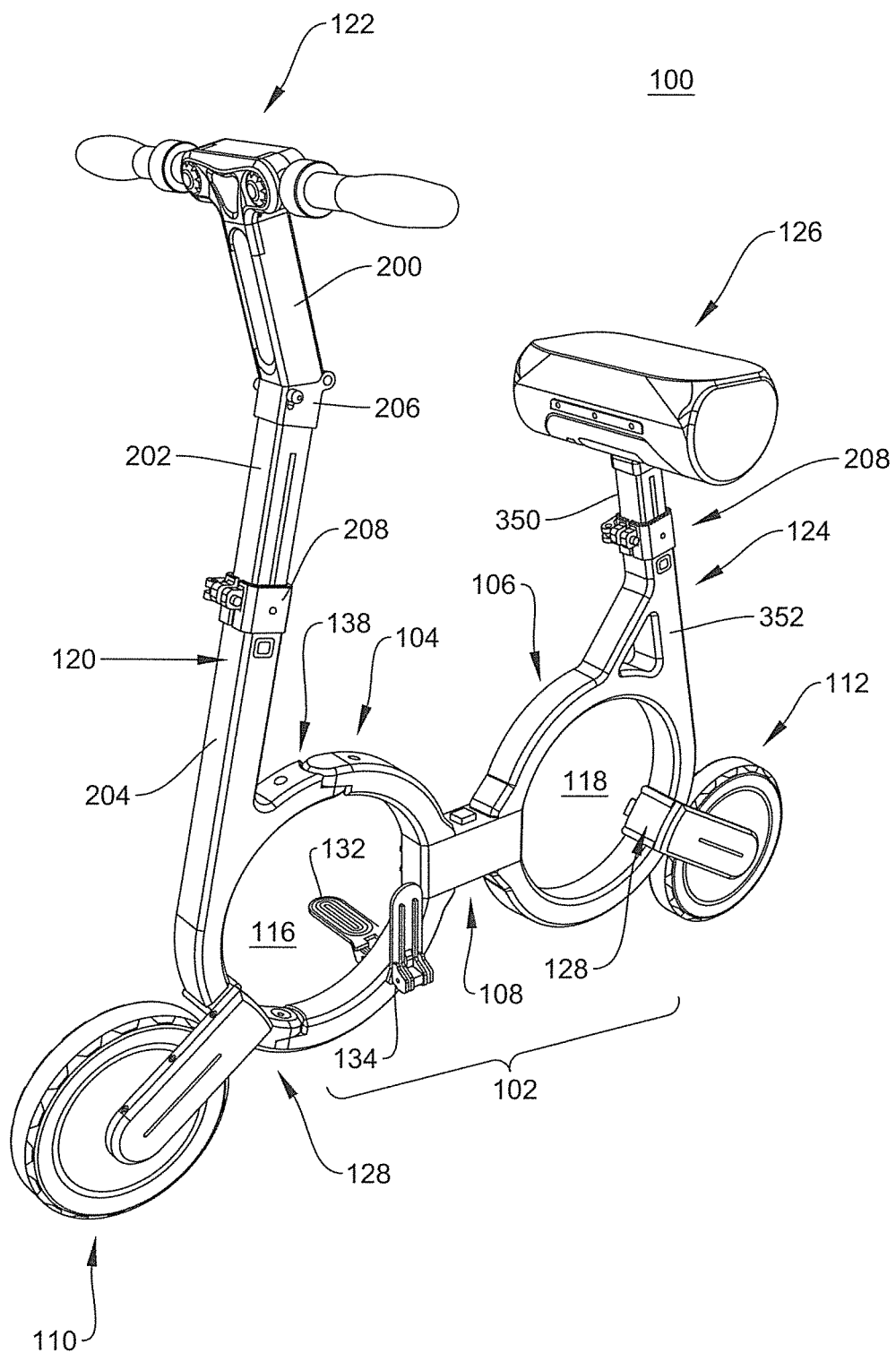
FIG. 1 is a perspective view showing a foldable vehicle according to one embodiment of the present invention shown in its use configuration.

The present invention provides a foldable vehicle 100 that can be folded into a smaller size which allows the folded vehicle 100 to be stored into a backpack so that it can be conveniently carried around when not in use. Referring to FIG. 1, the foldable vehicle 100 has a foldable body frame 102 that has a front wheel frame 104 and a rear wheel frame 106 that can be folded against each other about a central pivot joint 108. Each wheel frame 104 and 106 is generally circular in configuration and is sized and configured to receive a front wheel 110 and a rear wheel 112, respectively, inside the open circular space defined by the wheel frame 104, 106. The front wheel 110 can be folded about the front wheel frame 104 via a pivoting locking assembly 128 to be stored inside the open space 116 defined by the front wheel frame 104, and the rear wheel 112 can be folded about the rear wheel frame 106 via another pivoting locking assembly 128 to be stored inside the open space 118 defined by the rear wheel frame 106. A front vertical support 120 extends from the front wheel frame 104 and is adapted to support a handlebar assembly 122. A rear vertical support 124 extends from the rear wheel frame 106 and is adapted to support a seat assembly 126.

The foldable vehicle 100 can be an electrically-powered bicycle having a chargeable battery provided inside the seat assembly 126. As shown in FIG. 1, a user can sit on the seat assembly 126 and ride the vehicle 100 by controlling the on/off operation and speed of the vehicle 100 via a control panel provided in the handlebar assembly 122. The user can rest his or her feet on two pivotable pedals 132 and 134 that are pivotably secured to the front wheel frame 104. The user can grasp the handlebars 212 on the handlebar assembly 122, and turn or steer the vehicle 100. The turning or steering motion can be accomplished by providing the front wheel frame 104 with a steering mechanism 138.

Figure 2:
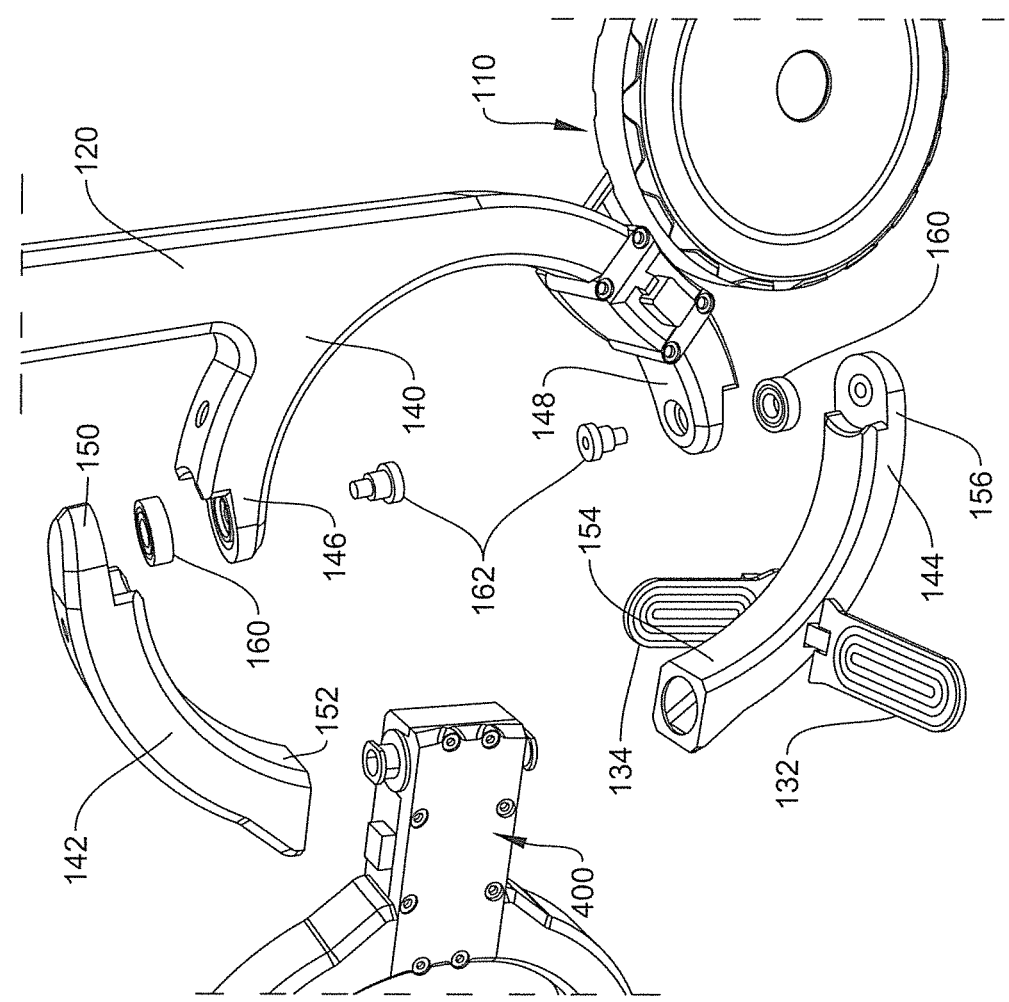
FIG. 2 is an exploded perspective view illustrating the front wheel frame of the foldable vehicle of FIG. 1.

Referring to FIG. 2, which shows the components of the steering mechanism 138, the front wheel frame 104 is provided in three segments, a curved front segment 140, a curved upper rear segment 142, and a curved lower rear segment 144. The front vertical support 120 extends from the curved front segment 140, which has an upper end 146 and a lower end 148. The curved upper rear segment 142 has an upper end 150 and a lower end 152, and the curved lower rear segment 144 has an upper end 154 and a lower end 156. The upper end 146 of the front segment 140 is pivotably connected to the upper end 150 of the upper rear segment 142 via a bearing 160 and a locking screw 162 that extends through an opening in the upper end 146. Similarly, the lower end 148 of the front segment 140 is pivotably connected to the lower end 156 of the lower rear segment 144 via a bearing 160 and a locking screw 162 that extends through an opening in the lower end 148. The lower end 152 of the upper rear segment 142 and the upper end 154 of the lower rear segment 144 are connected to a locking shaft 402 of the central pivot joint 108. As a result, the front segment 140 can be pivoted with respect to the rear segments 142 and 144, thereby allowing the user to steer the vehicle 100 by turning the front segment 140.

The front vertical support 120 includes an upper tubular section 200, a central tubular section 202, and a lower tubular section 204. Each tubular section 200, 202 and 204 can be four-sided with a hollow interior. The tubular sections 200 and 202 are connected via a pivot joint 206, and the tubular sections 202 and 204 are connected via a sliding joint 208.

Referring to FIGS. 3-6, the handlebar assembly 122 has a handlebar housing 210 secured above the upper tubular section 200, and two handlebars 212 extending from opposite sides of the handlebar housing 210. The handlebar housing 210 has a rear cover 214 and a front cover 216 that are secured together, with two shafts 218 extending from the inside of the rear cover 214 towards the front cover 216. Each shaft 218 supports a spring 220. A release button assembly 222 has a release button 224 and wings 226 extending from opposite ends thereof. The release button 224 is positioned partially inside the handlebar housing 210, and its front surface extends through an opening 228 in the front cover 216. The forward-facing end of each spring 220 abuts against the inner surface of a corresponding wing 226. In addition, each wing 226 has a flat terminal surface or edge 230.

Each handlebar 212 has a pivot block 236 that is retained inside the handlebar housing 210, a brake control 238 adjacent the pivot block 236, and a handle grip 240 extending from the brake control 238 opposite from the pivot block 236. The braking function is activated by fully rotating a handle 258 of the brake control 238 downwards. This will electronically activate the electric braking system (not shown) inside the motor (not shown) of the front wheel 10, slowing down the vehicle 100. A spring (not shown) will automatically push back the brake control 238 to its original position when released. Each pivot block 236 has an opening 246, and two shafts 242 extending from the inside of the rear cover 214 towards the front cover 216 are adapted to extend through the openings 246. Each pivot block 236 has a flat surface 244 that is adapted to abut the flat surface 230 of a corresponding wing 226.

An LED light panel 250 is provided in the upper tubular section 200, with a translucent cover 252 covering the light panel 250. The light panel 250 provides illumination for the vehicle 100, and can be actuated by switches (not shown) that are provided on the seat assembly 126 or on the handlebar assembly 122. As an example, the front LEDs can be turned on via a mobile app and/or via pushing a main switch 378 on the seat support 354. See FIGS. 12A and 13. Once the vehicle 100 is turned on the first time, by pressing the same main switch 378, the LED lights will turn on. Conversely, the LED lights can be turned off via mobile app and/or by pressing the same main switch 378.

Figure 3:
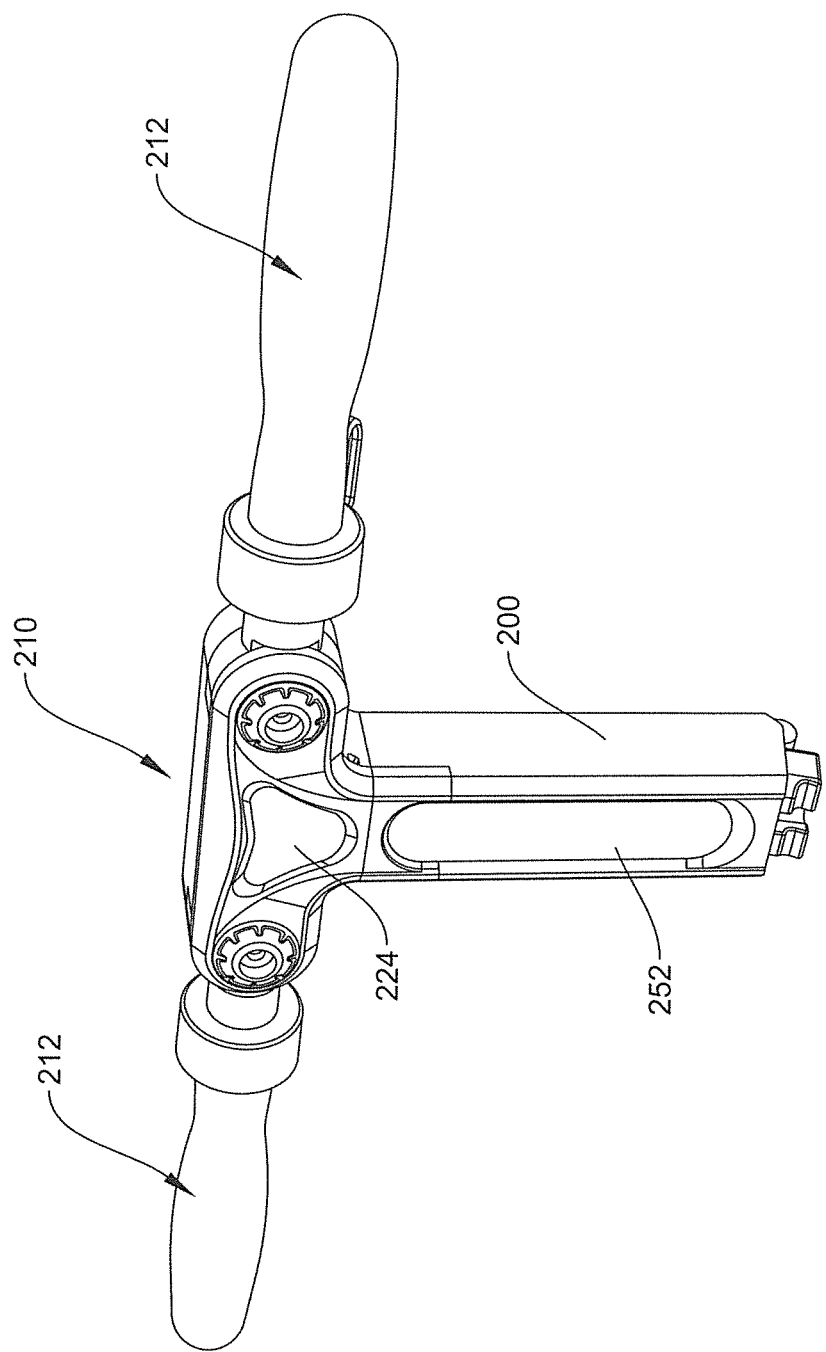
FIG. 3 is a front view of the handlebar assembly of the foldable vehicle of FIG. 1.
Figure 4:
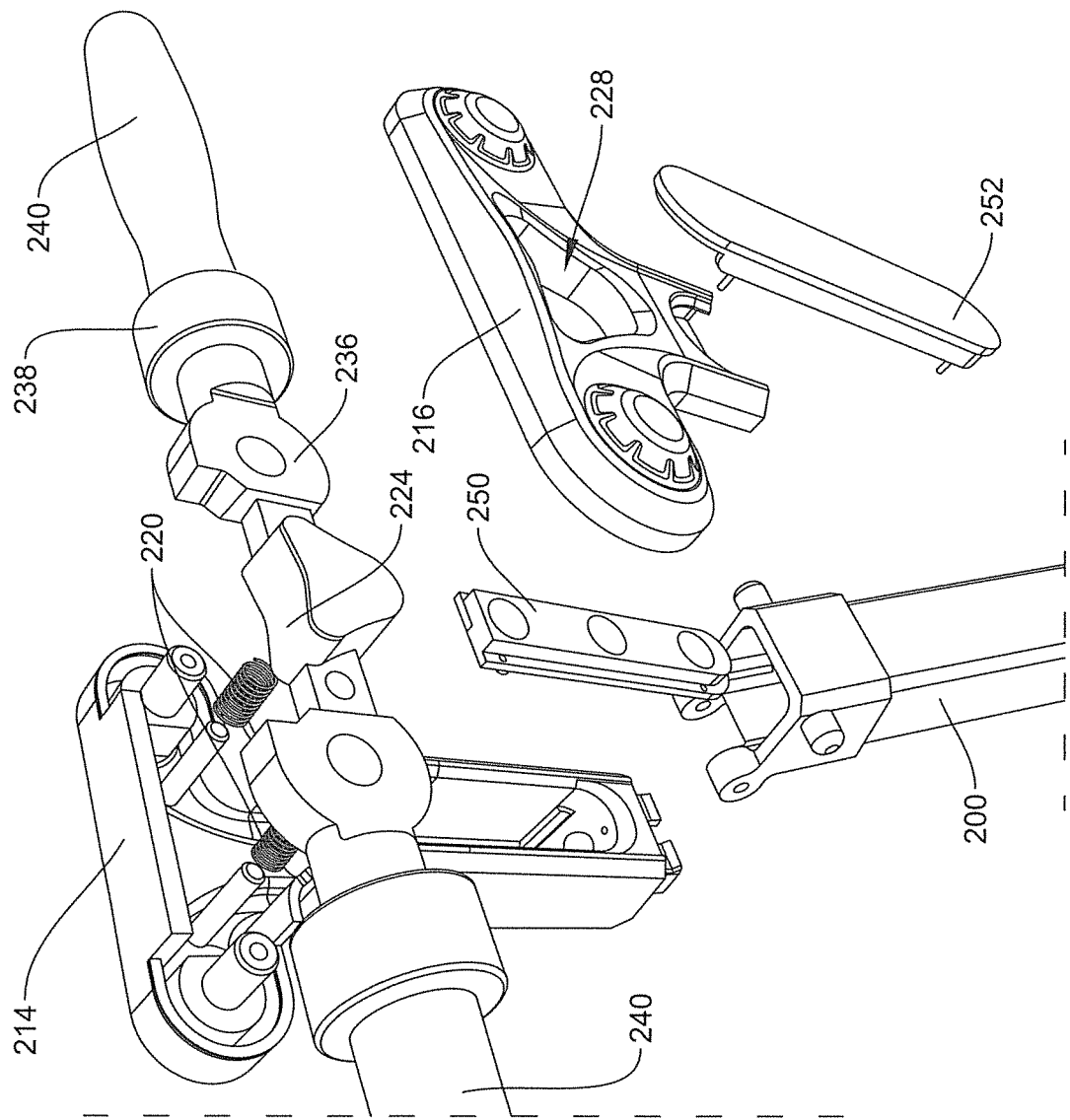
FIGS. 4 and 5 are two different exploded front perspective views of the handlebar assembly of FIG. 3.
Figure 5:
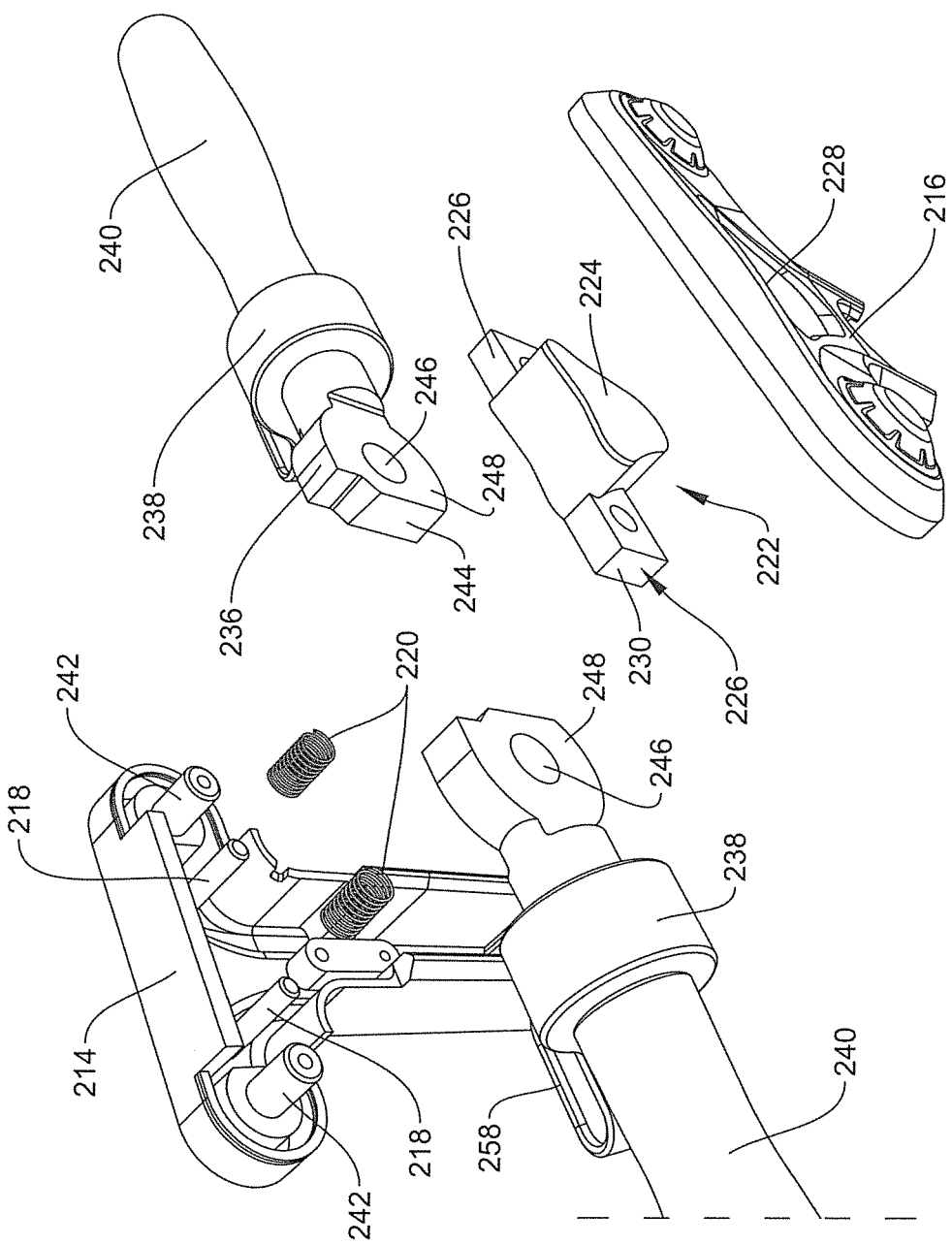
Figure 6:
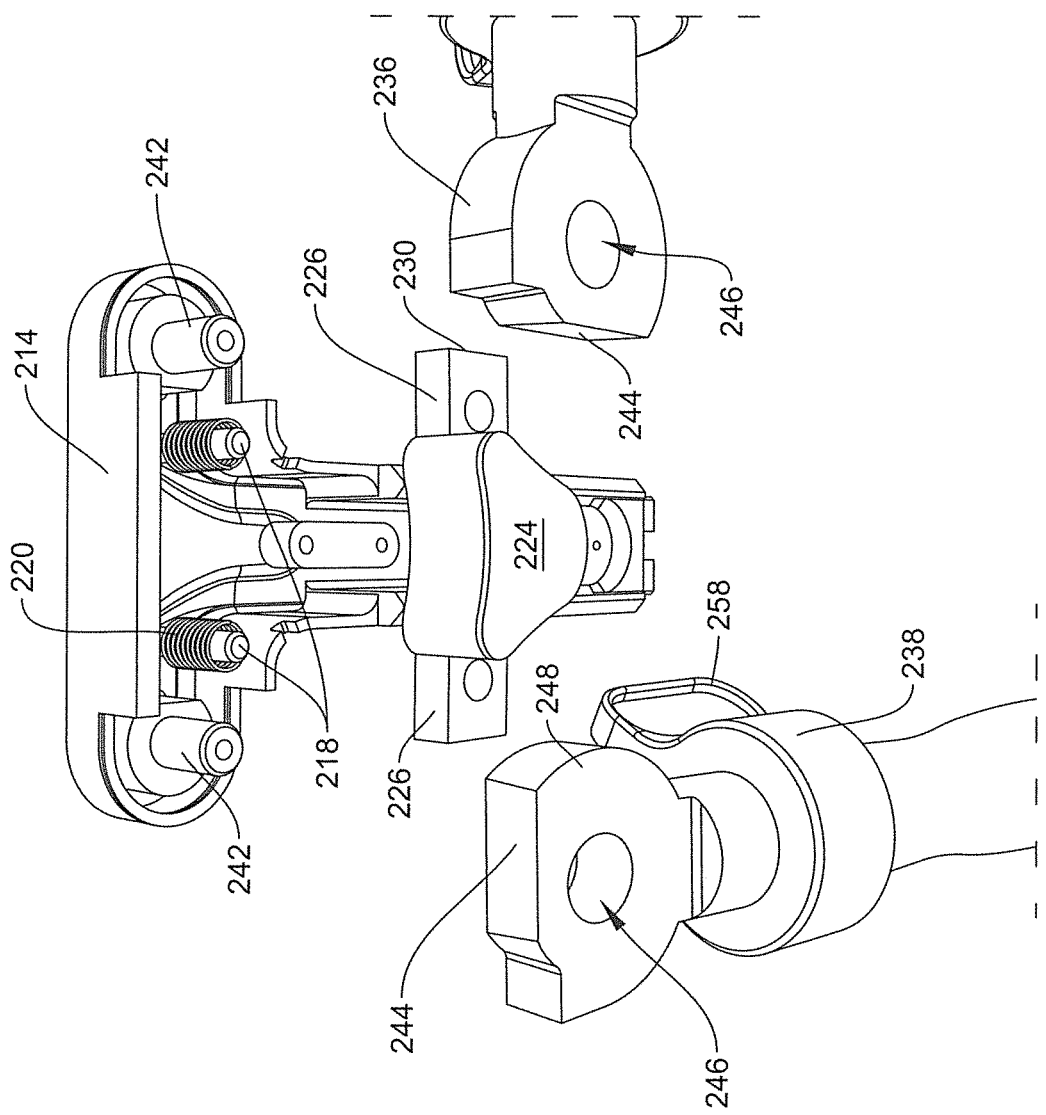
FIG. 6 is an exploded top perspective view of the handlebar assembly of FIG. 3.
Figure 7A:
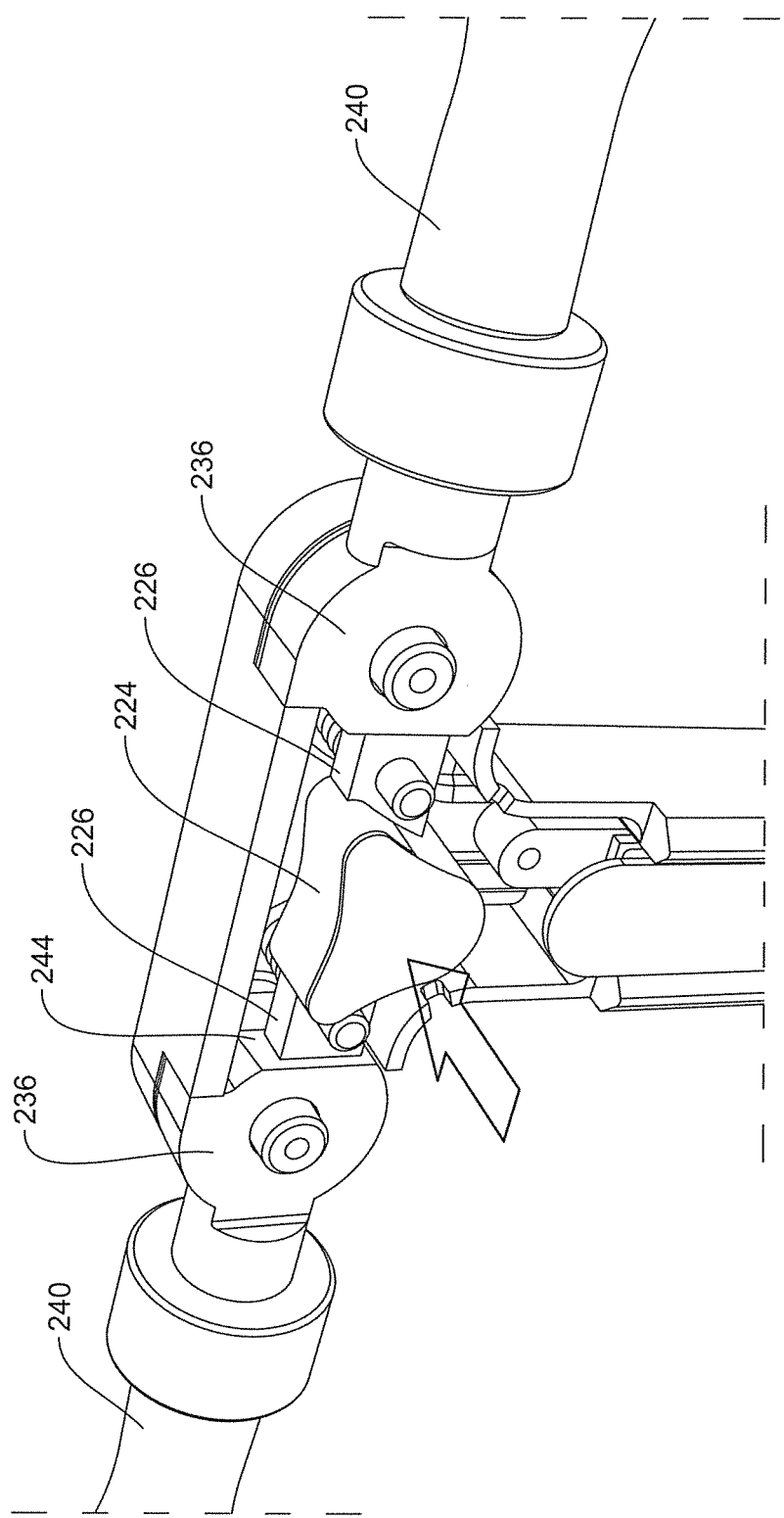

The operation of the handlebar assembly 122 is best illustrated in connection with FIGS. 3-6 and 7A-7C. FIGS. 3, 4 and 7A illustrate the handlebar assembly 122 in use, where the springs 220 normally bias the wings 226 (and the release button 224) outwardly, so that the flat surfaces 230 of the wings 226 abut the flat surfaces 244 of the pivot blocks 236. When the user wishes to fold the handlebar grips 240, the user presses the release button 224 inwardly against the bias of the springs 220 (see FIG. 7A), which causes the wings 226 to disengage from the pivot blocks 236 (see FIGS. 6 and 7B). This allows the handlebar grips 240 to be pivoted downwardly (see FIGS. 7B and 7C). The inside surface of each pivot block 236 then presses against each wing 226, as best shown in FIG. 7C. When the user desires to re-deploy (unfold) the handlebar grips 240, the user simply pivots the handlebar grips 240 upwardly until the body of the pivot blocks 236 release the respective wing 226, and the springs 220 will bias the wings 226 back outwardly to cause the flat surfaces 230 of the wings 226 to abut the flat surfaces 244 of the pivot blocks 236 again.

To allow for this pivoting and blocking function, the shape of each pivot block 236 must be configured to provide an extension from an end edge of the flat surface 244. In the embodiment shown in FIGS. 3-6 and 7A-7C, the extension 248 can take the form of additional mass that will function to block or press against each wing 226 as shown in FIG. 7C. The extension 248 can be rounded or have two sides or edges (not shown).

Figures 8A, 8B:
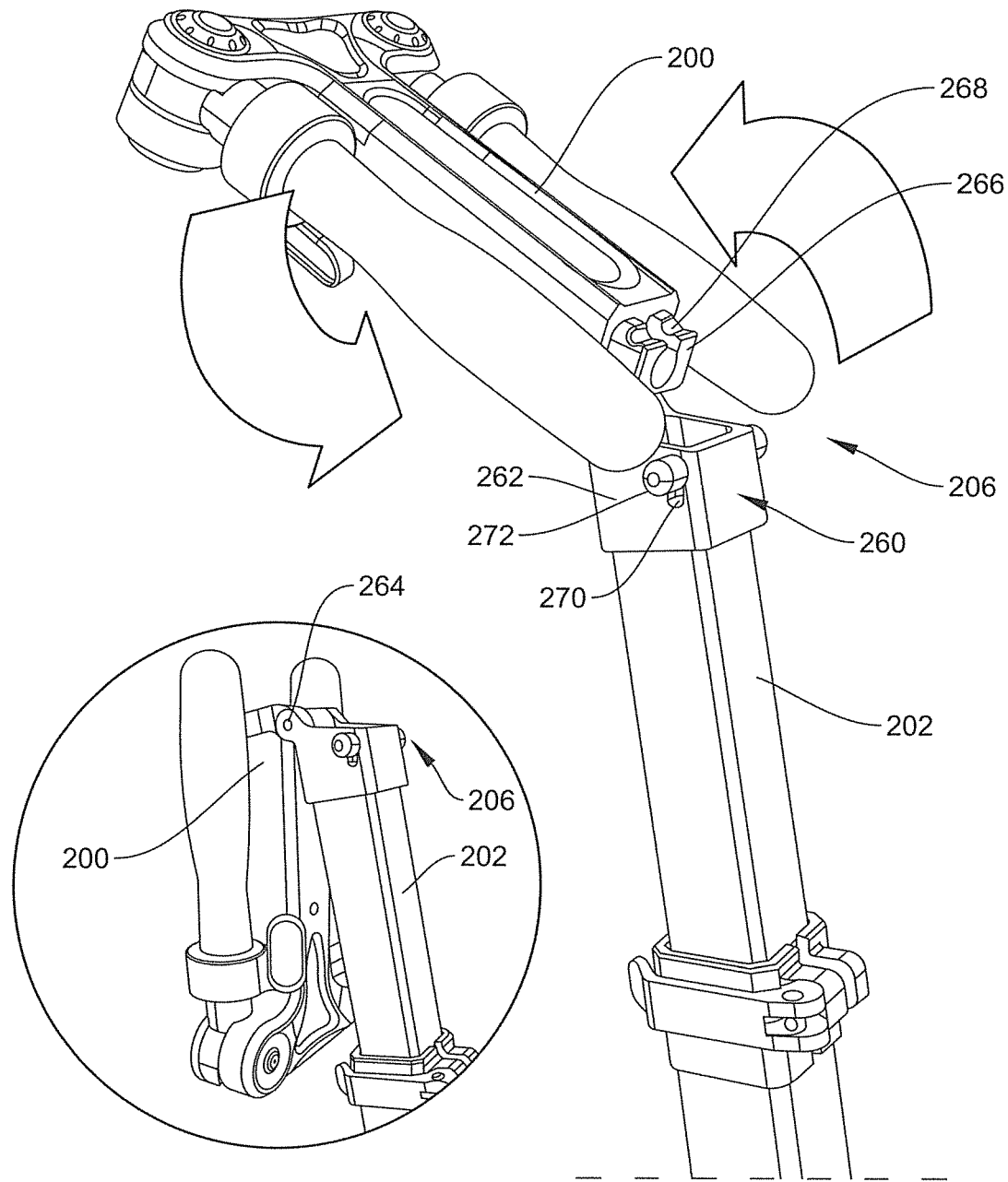
FIGS. 8A and 8B are side perspective views illustrating the pivoting of the upper tubular section of the handlebar assembly about the pivot joint.
Figure 8C:
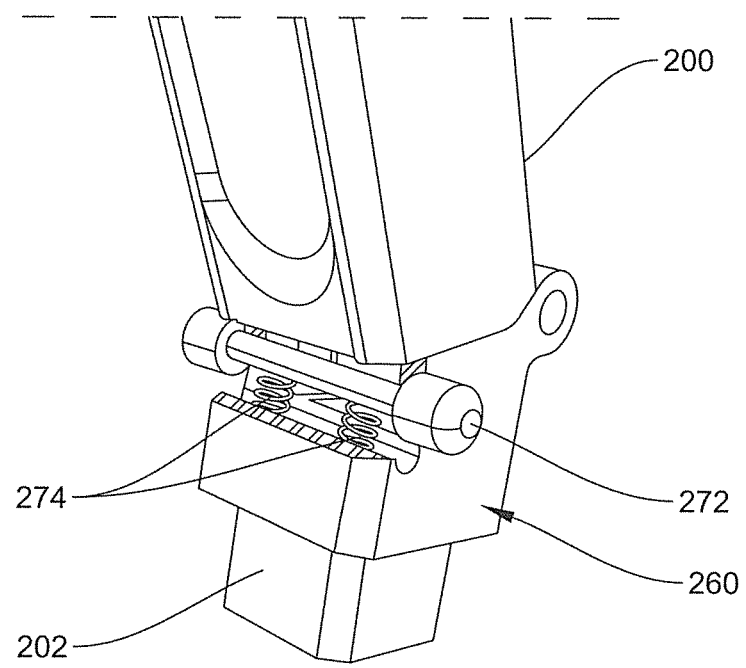
FIGS. 8C-8F are cut-away sectional views illustrating the pivoting of the upper tubular section of the handlebar assembly about the pivot joint.
Figure 8D:
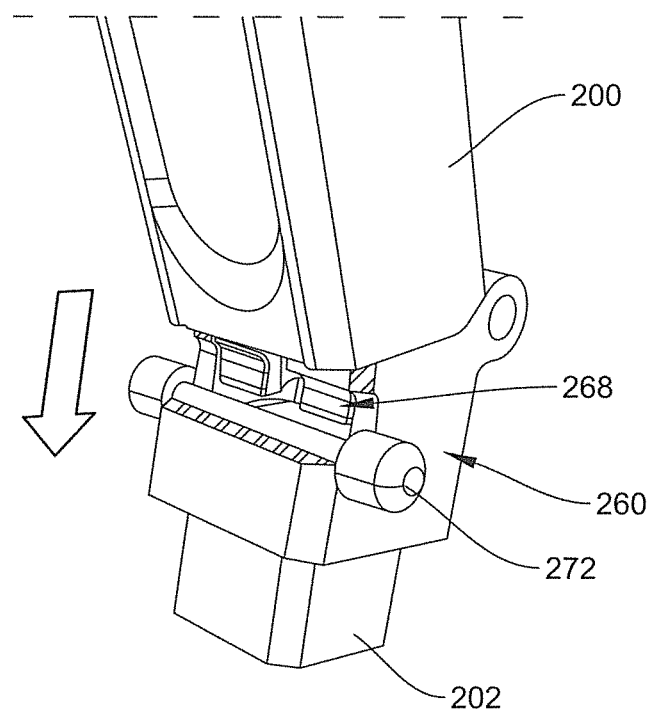
Figure 8E:
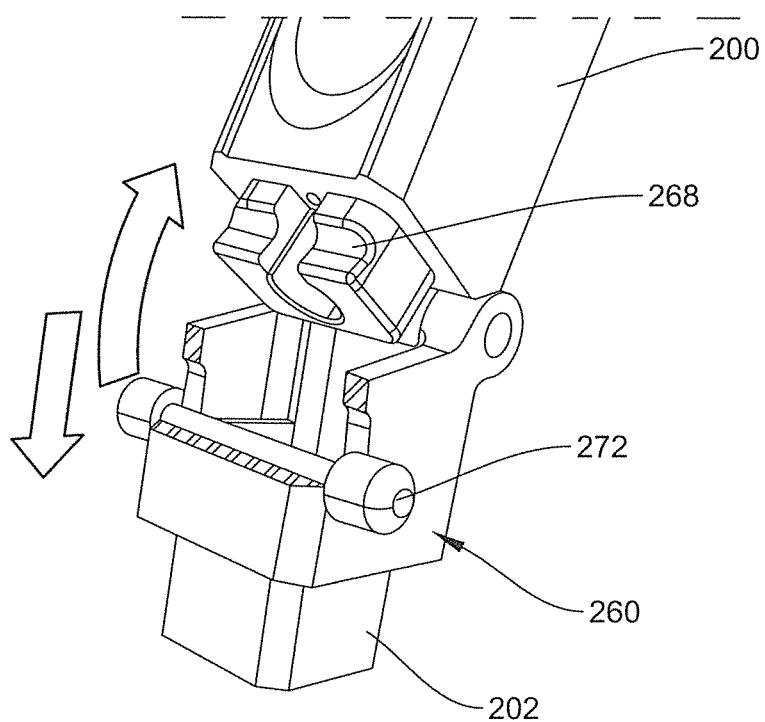
Figure 8F:
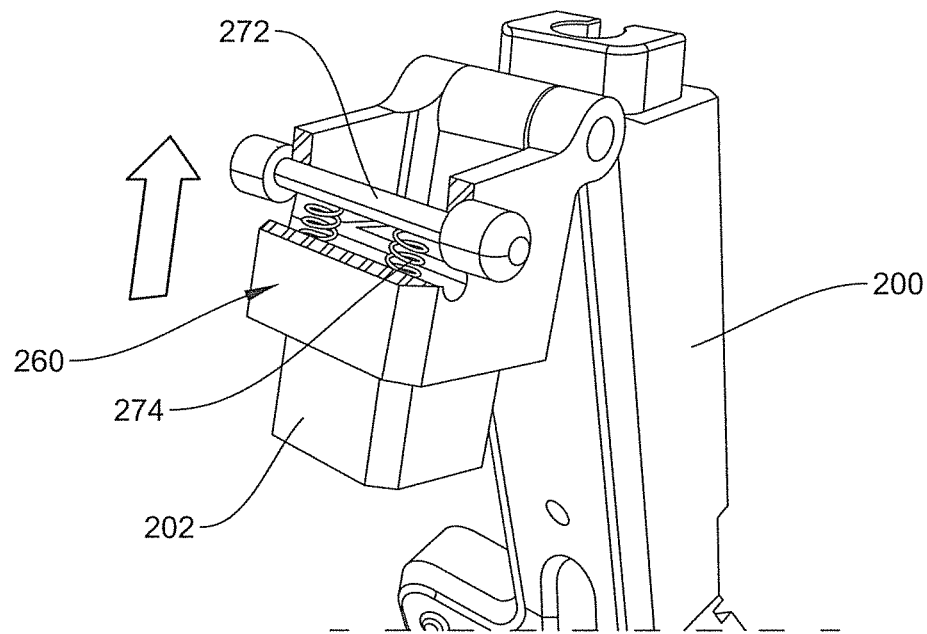

Referring now to FIGS. 8A and 8B, the pivot joint 206 has a housing 260 with four side walls 262, and the bottom end of the upper tubular section 200 is hingedly connected to one side of the housing 260 via a hinge joint 264. The bottom end of the upper tubular section 200 also includes a connector block 266 with a groove 268 provided therein. Each of two side walls 262 of the housing 260 is provided with an aligned channel 270, and a slider lock 272 (which can be a sliding bar) is positioned for up and down movement within the aligned channels 270. The slider lock 272 is adapted to be seated inside the groove 268 to secure the bottom end of the upper tubular section 200 to the pivot joint 206. Referring also to FIG. 80, a pair of springs 274 are provided in the housing 260 and are adapted to bias the slider lock 272 into the groove 268. When the slider lock 272 is pushed down (FIG. 8D), the slider lock 272 can be disengaged from the groove 268 (see FIG. 8E). The springs 274 will then bias the slider lock 272 back up (see FIG. 8F) when the upper tubular section 200 is pivoted by 180 degrees. When the user folds the upper tubular section 200 back to its use position, the slider lock 272 is biased by the springs 274 back into the groove 368 to lock the pivot joint 206.

Referring now to FIGS. 9, 10 and 11A-11C, the sliding joint 208 facilitates the telescoping sliding retraction of the central tubular section 202 into the lower tubular section 204. The upper end of the central tubular section 202 is connected to the housing 260, as shown in FIGS. 8A and 8B. The lower end of the central tubular section 202 is coupled to an internal tubular section 276 that extends from the upper end of the lower tubular section 204, and can be made from one piece with the lower tubular section 204. The sliding joint 208 has an enclosing frame 278 that is generally C-shaped having three sides 280a, 280b and 280c, and two free sides 282a and 282c extending from the edges of the sides 280a and 280c, respectively. An internal channel 284 is defined inside the frame 278, and the tubular sections 202 and 276 both extend through the channel 284. A locking button 286 is retained inside both the tubular sections 202 and 276, and includes a holder that is made up of a smaller-diameter tube 288 and a button that has a larger-diameter flange 290 that extends outside the tube 288 and can be slid longitudinally with respect to the tube 288. The button also includes a button cap 292. A spring 294 is housed inside the tube 288 and the button cap 292. The flange 290 has a larger diameter than the tube 288 and the button cap 292.

The lower end of the central tubular section 202 has an indented opening 296 which is adapted to retain an adapter piece 298, and the upper end of the lower tubular section 204 has another indented opening 300 which is adapted to retain another adapter piece 302. The locking button 286 is retained inside the central tubular section 202 at the location of the indented opening 296. A slot 306 is provided along the internal tubular section 276 and another slot 308 is provided along the central tubular section 202. The slots 306 and 308 function as tracks for a screw 310 to travel along. The screw 310 extends through an opening 312 in the side 280c of the frame 278.

A locking lever 320 is provided to tighten or loosen the frame 278, and has two earlobes 322a and 322b that define a space between them. A pivot shaft 324 extends through aligned openings 326a and 326b in the earlobes 322a and 322b, respectively, and the pivot shaft 324 also has an opening 328 provided transverse to its longitudinal direction. An ear 314a, 314c extends from each of the sides 282a and 282c, and each side 282a and 282c has an opening 316 therethrough. A locking screw 330 extends through the openings 316 in the ears 314a, 314c, and then through the space between the earlobes 322a and 322b, into the transverse opening 328 in the pivot shaft 324. A curved support piece 332 can be provided between the ear 314a and the end of the earlobes 322a and 322b.

Figure 17:
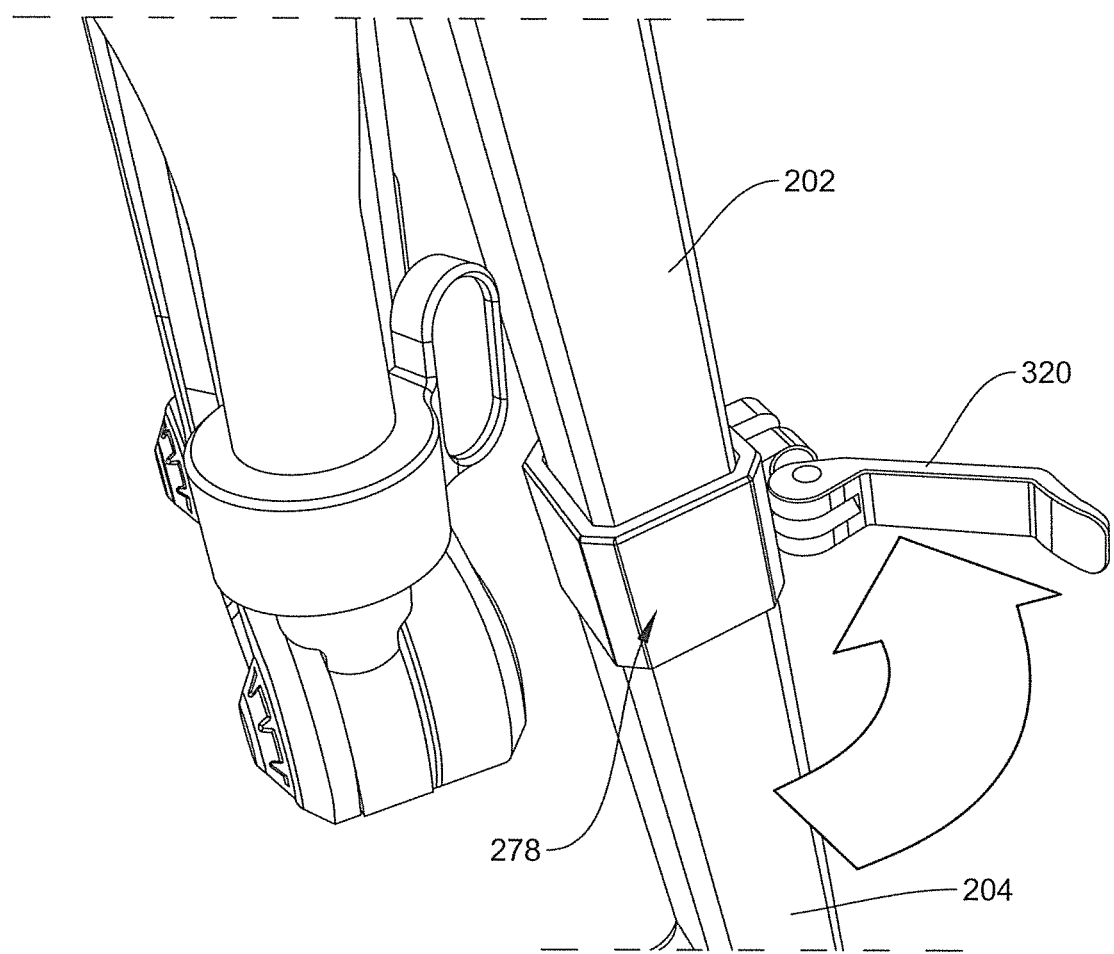
FIG. 17 illustrates the turning of the lever for the pivot joint of FIG. 9.

In use, the locking screw 330 can be loosened, and then the lever 320 pivoted away from the frame 278, to loosen the frame 278 of the sliding joint 208. See FIG. 17. When the locking screw 330 is loosened and the lever 320 pivoted away, the space between the ears 314a and 314b increases, thereby allowing the central tubular section 202 to be able to slide within the frame 278. The user can then press on the button cap 292 (see FIGS. 10 and 11A) to go against the natural bias of the spring 294, thereby releasing the button cap 292 from engaging the adapter piece 302 of the lower tubular section 204. The adapter piece 298 is always carried on the button cap 292, so the locking button 286 will always travel with the central tubular section 202. With the button cap 292 pressed, the central tubular section 202 can be pushed into the lower tubular section 204. See FIGS. 11B and 11C. The screw 310 can travel along the tracks defined by the slots 306 and 308. The upper end of the slot 308 also provides a stop mechanism for limiting the travel of the central tubular section 202 into the lower tubular section 204. The lever 320 can now be pivoted back towards the frame 278, and the locking screw 330 tightened, to secure the retracted central tubular section 202 inside the lower tubular section 204.

To deploy the vehicle 100 for use, the locking screw 330 can be loosened, and then the lever 320 pivoted away from the frame 278, to loosen the frame 278 of the sliding joint 208. The central tubular section 202 can be pulled out of the lower tubular section 204, and when the button cap 292 reaches the location of the indented opening 300, the spring 294 will naturally bias the button cap 292 outwardly to be locked in the indented opening 300. The lever 320 can now be pivoted back towards the frame 278, and the locking screw 330 tightened, to secure the central tubular section 202 above the lower tubular section 204.

Figure 12A:
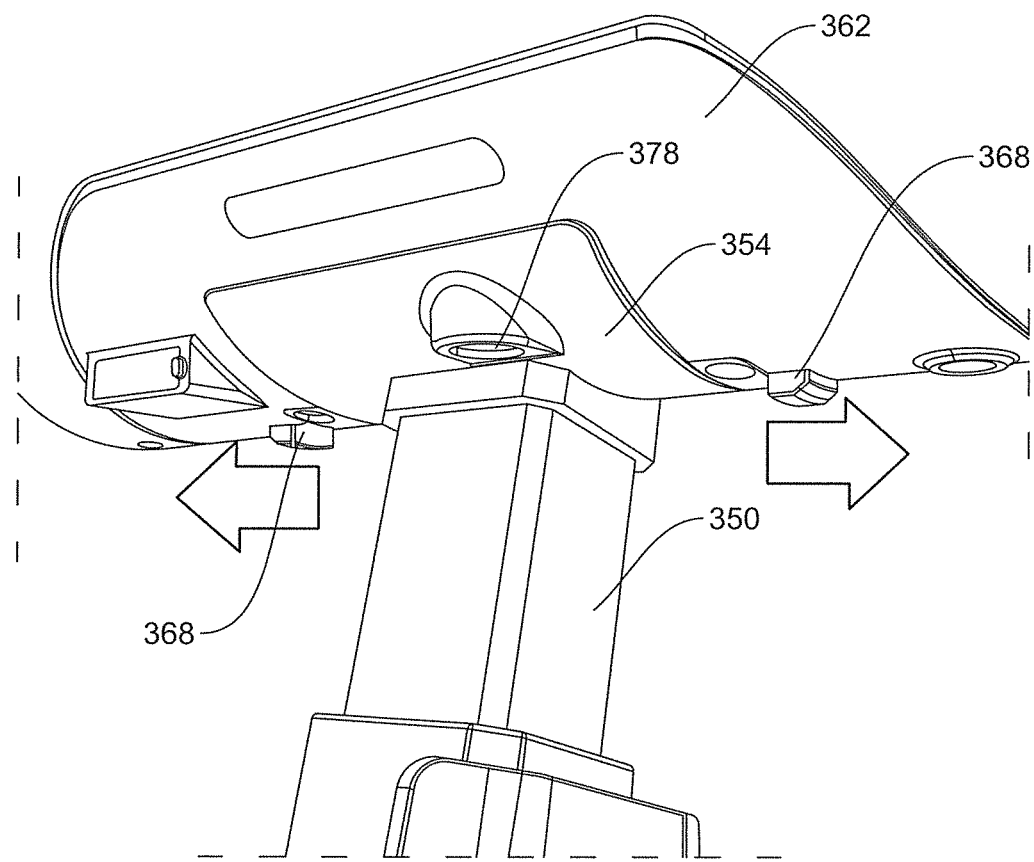
FIGS. 12A-12B illustrates how the seat assembly is removed from the seat support.
Figure 12B:
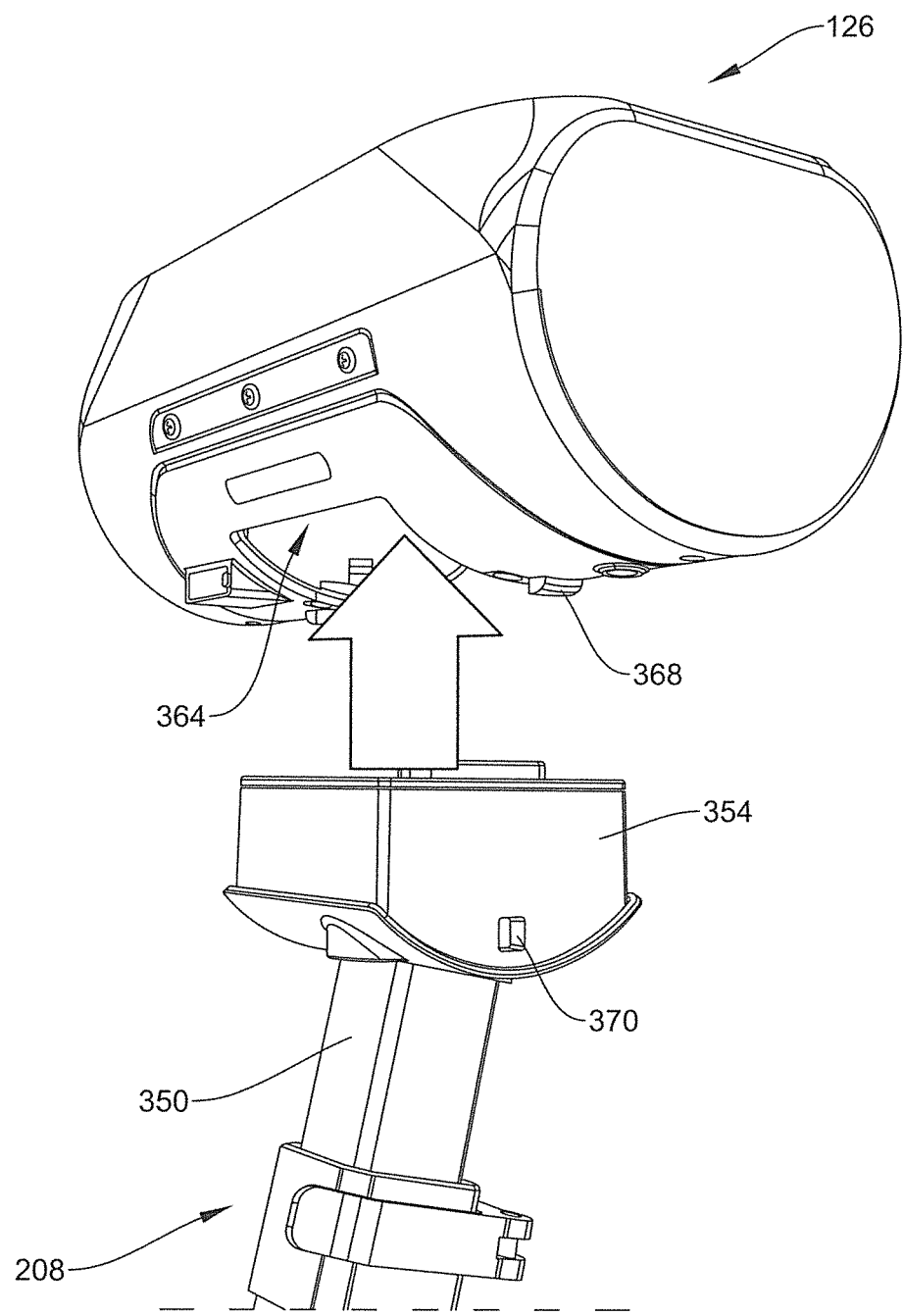
Figure 13:
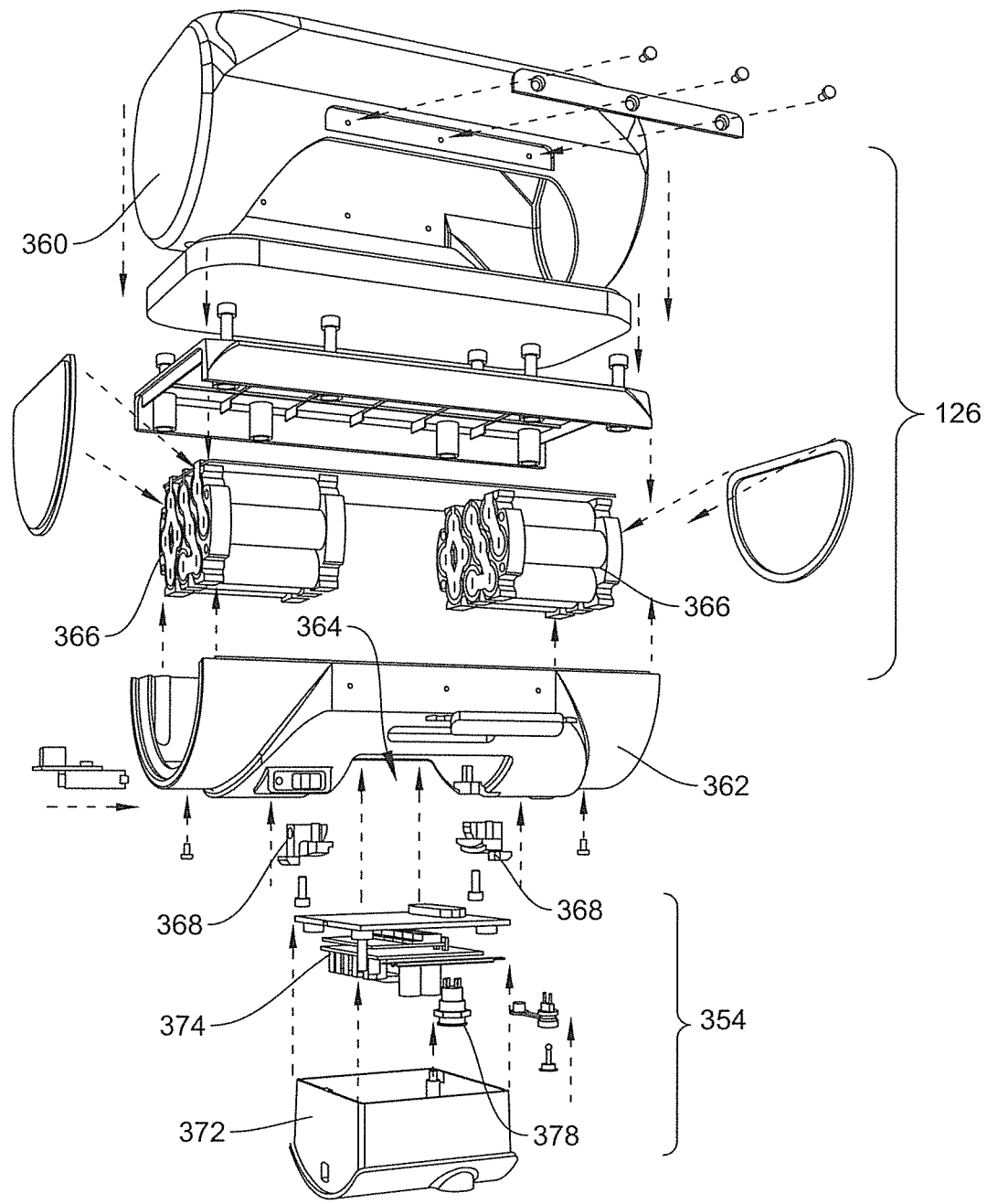
FIG. 13 is an exploded perspective view of the seat assembly of the foldable vehicle of FIG. 1.

Referring to FIGS. 12A and 12B, the rear vertical support 124 includes an upper tubular section 350 and a lower tubular section 352 that are coupled via a sliding joint 208 that can be the same as the sliding joint 208 shown and described above in connection with FIGS. 9, 10 and 11A-11C. The tubular sections 350 and 352 can be the same as tubular sections 202 and 204, respectively, and their respective sliding connections with the sliding joint 208 can be same as well. Referring also to FIG. 13, a seat support 354 is secured to the upper end of the upper tubular section 350, and the seat assembly 126 is removably secured to the seat support 354.

The seat assembly 126 includes a seat housing that includes an upper housing 360 and a lower housing 362. The upper housing 360 serves as the seat for the rider, and the lower housing 362 has an opening 364 that defines a receiving section for receiving the seat support 354. Batteries 366 can be housed inside the seat housing, and then electrically coupled (via wires and electrical contacts that are not shown in the FIGS.) to the handlebar assembly 122 and other parts of the foldable vehicle 100. These wires can be installed through the hollow interiors of the tubular sections 350, 352, 204, 202 and 200, as well as through the hollow interiors of the wheel frames 104 and 106. Two sliding latch locks 368 are provided at the bottom of the lower housing 362 to removably secure the lower housing 362 to the seat support 354. The construction and operation of the latch locks 368 can be similar to those known in the art, and will not be described in greater detail herein. For example, the latch locks 368 are normally biased to engage slots 370 provided in the housing 372 of the seat support 354.

The seat support 354 can have a housing 372 which houses electronics such as a circuit board 374 for controlling the operation of the foldable vehicle 100, as well as the main switch 378.

Figure 14:
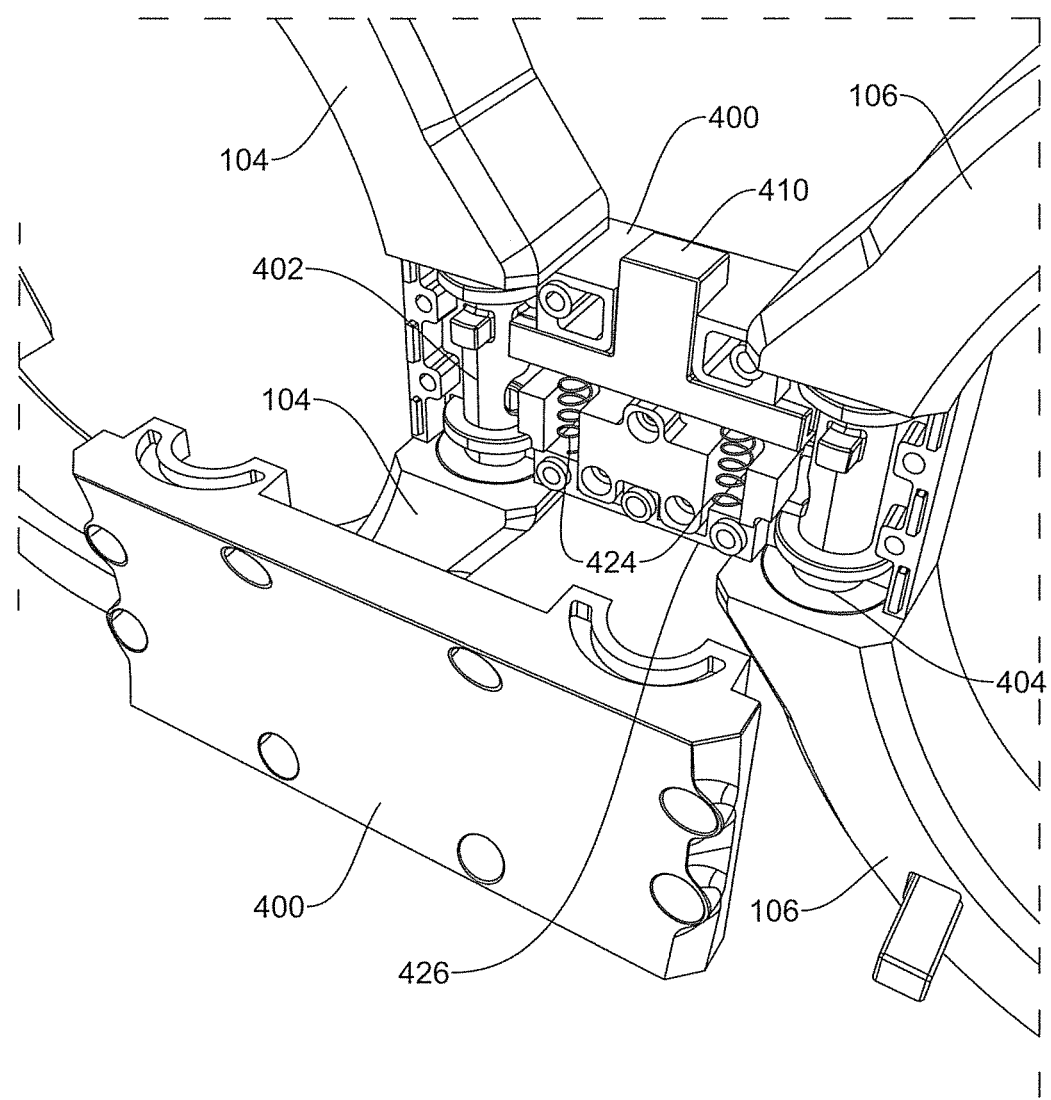
FIG. 14 is a perspective view of the central pivot joint of the foldable vehicle of FIG. 1.
Figure 15:
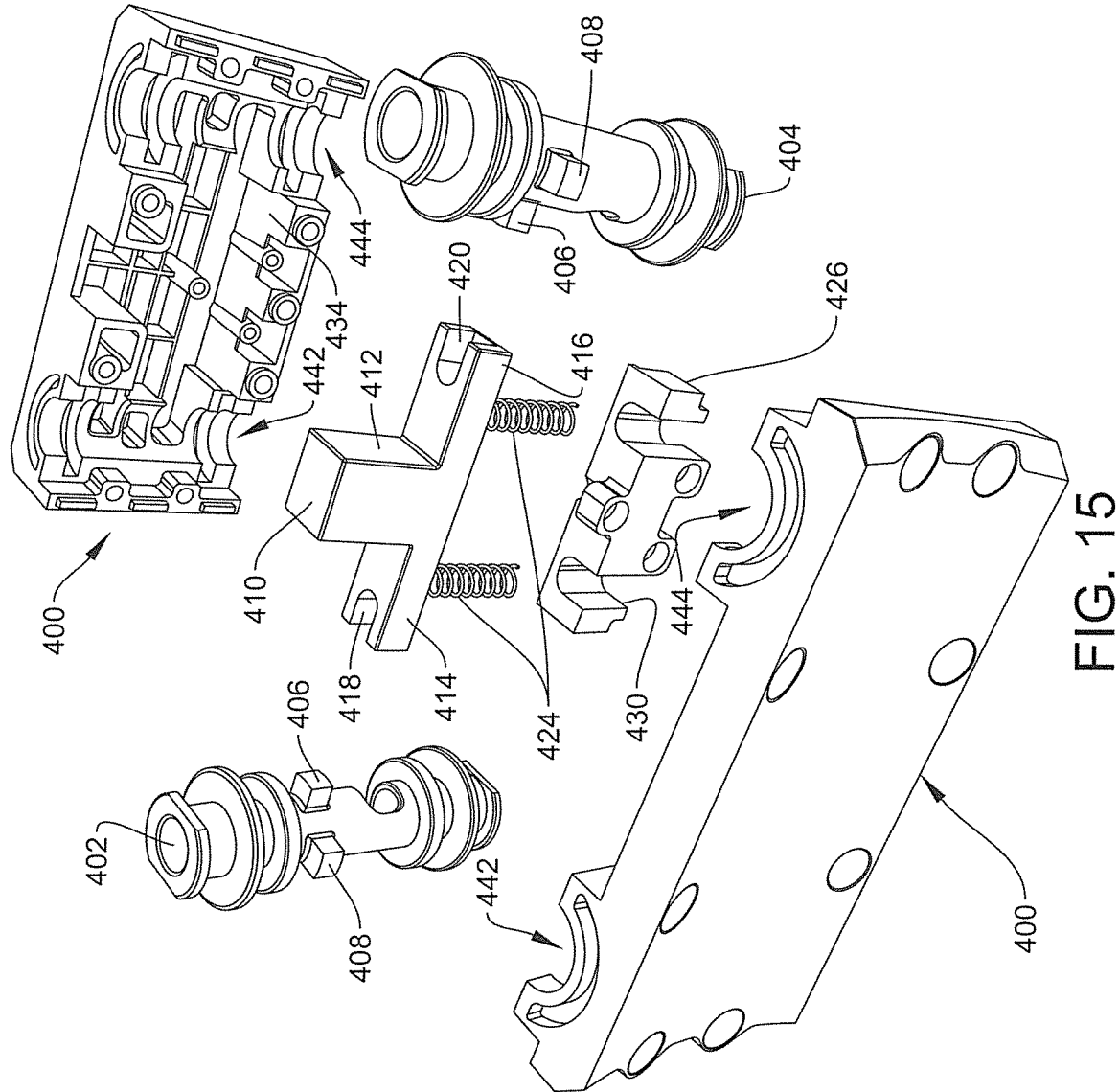
FIG. 15 is an exploded perspective view of the central pivot joint of FIG. 14.

FIGS. 14-15 illustrate the central pivot joint 108 that allows the two wheel frames 104 and 106 to be folded. The pivot joint 108 has a lock box body 400 that is made up of two housing covers. Two locking shafts 402 and 404 are positioned for rotation inside corresponding channels 442 and 444, respectively, inside the lock box body 400 for pivoting the wheel frames 104 and 106, respectively. Each locking shaft 402 and 404 has two locking protrusions 406 and 408 which are aligned at the same vertical level and positioned about 90 degrees apart from each other. A locking assembly is also positioned inside the lock box body 400 and has a locking button 410 that includes a central block 412 and two wings 414 and 416. Each wing 414 and 416 has a locking groove 418 and 420, respectively, and which is aligned at the same vertical level as the locking protrusions 406 and 408 on the locking shafts 402 and 404 so that the locking grooves 418 and 420 can receive one of the locking protrusions 406 and 408. At least one spring 424 is provided below the wings 414 and 416 to naturally bias the locking button 410 upwardly. A guide body 426 is provided below the spring(s) 424 and the locking button 410, and includes at least one channel 430 that is adapted to receive the spring 424. The upper surface of the guide body 426 also functions as a stop surface to prevent the push button 410 from being pushed too far into the lock box body 400. One end of the spring(s) 424 contacts the bottom of the locking button 410, and the other end of the spring(s) 424 contacts a lower surface 434 of one of the housing covers of the lock box body 400.

As shown in FIG. 14, free ends (e.g., 152 and 154) of the wheel frames 104 and 106 are connected to the opposite ends of each locking shaft 402 and 404, respectively.

In use, one set of locking protrusions 406 is retained in the locking grooves 418 and 420 when the vehicle 100 is deployed for use. When the user presses on the top of the locking button 410, the locking button 410 pushes against the natural bias of the spring(s) 424, which disengages the locking protrusions 406 from the locking grooves 418 and 420. This allows the locking shafts 402 and 404 (and the wheel frames 104 and 106, respectively, carried thereon) to be rotated by 90 degrees until the other locking protrusions 408 are engaged by the locking grooves 418 and 420. See FIG. 20. At this point, the locking shafts 402 and 404 are locked in the storage position by the locking grooves 418 and 420 on the locking button 410. See FIG. 21. To unfold the wheel frames 104 and 106, the user pushes on the locking button 410 again, causing the locking button 410 to push against the natural bias of the spring(s) 424, which disengages the locking protrusions 408 from the locking grooves 418 and 420. This allows the locking shafts 402 and 404 (and the wheel frames 104 and 106, respectively, carried thereon) to be rotated by 90 degrees in the other direction until the other locking protrusions 406 are engaged by the locking grooves 418 and 420. At this point, the locking shafts 402 and 404 are locked in the use configuration by the locking grooves 418 and 420 on the locking button 410.

Figure 10:
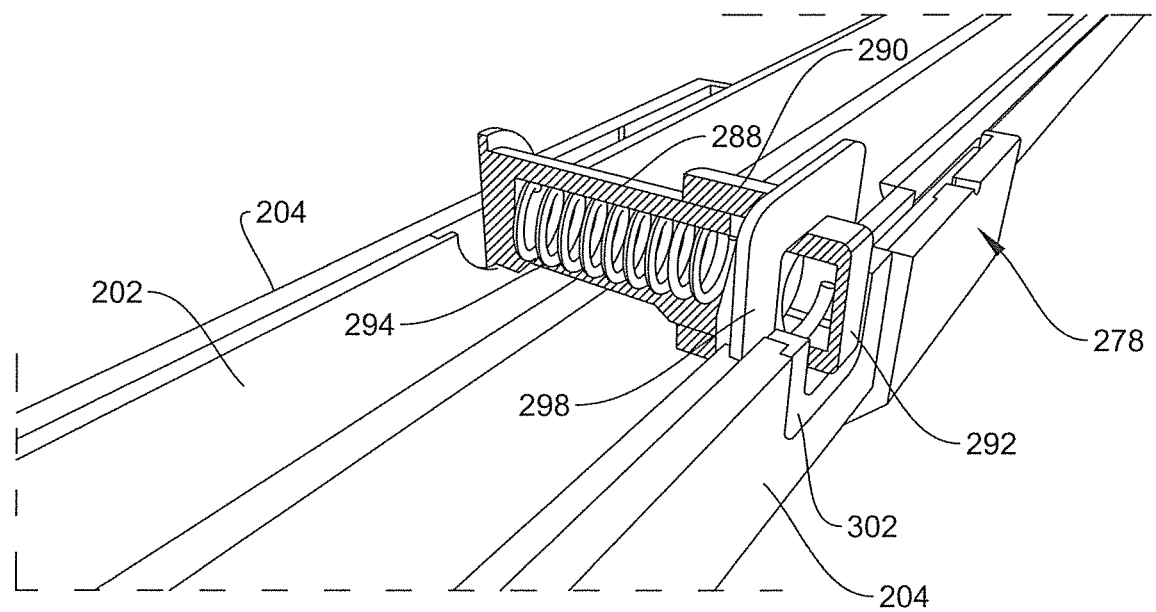
FIG. 10 is a cut-away perspective view of the sliding joint of FIG. 9.
Figure 9:
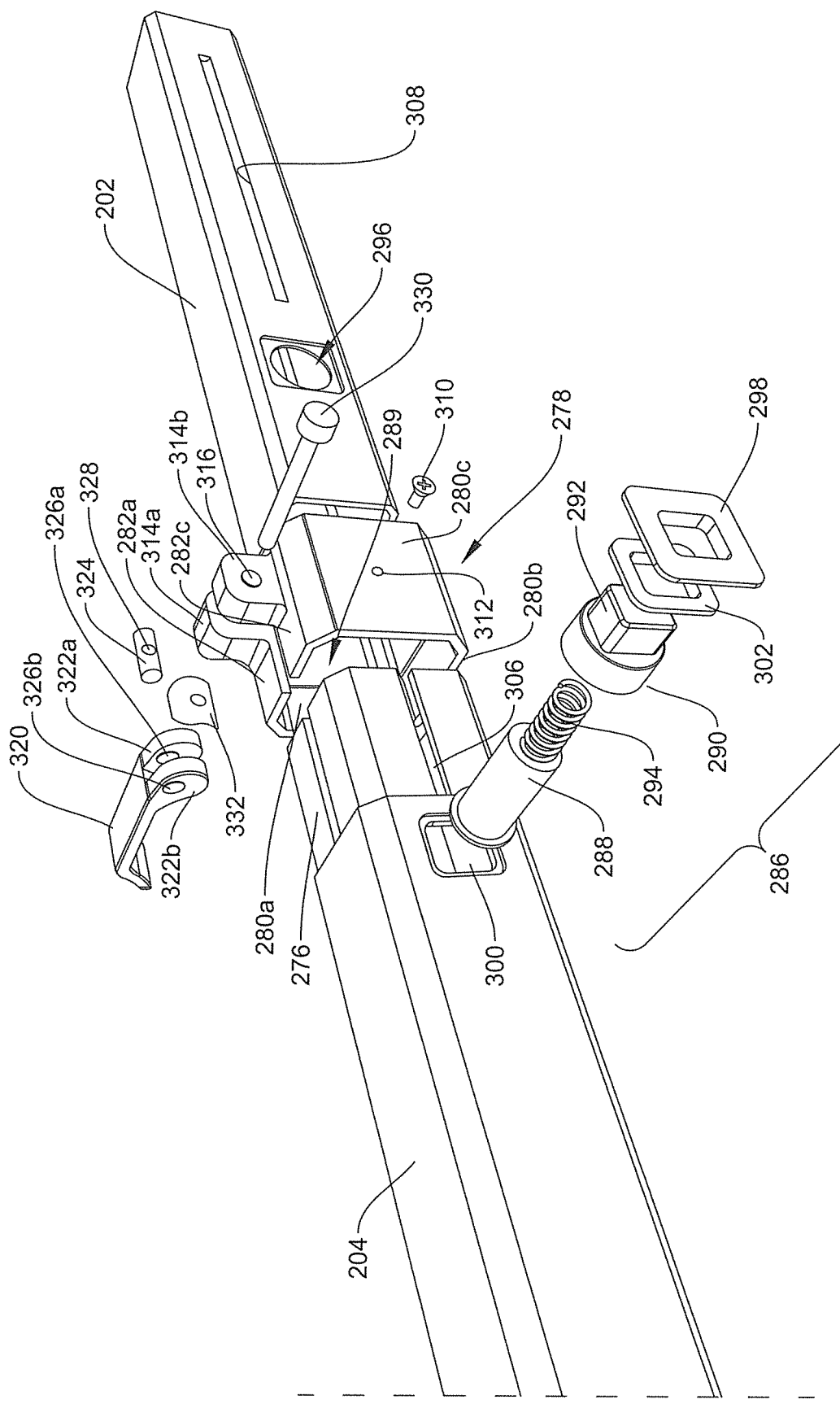
FIG. 9 is an exploded perspective view of the sliding joints of the foldable vehicle of FIG. 1.
Figure 11A:
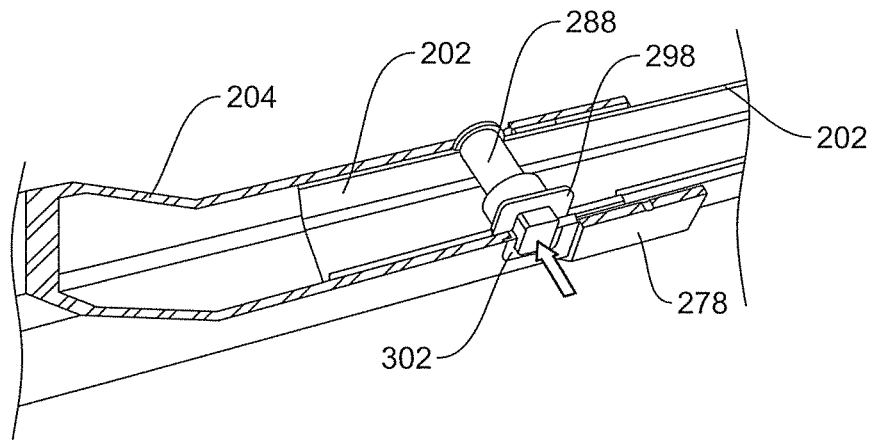
FIGS. 11A-11C are cut-away perspective views showing the operation of the sliding joint of FIG. 9.
Figure 11B:
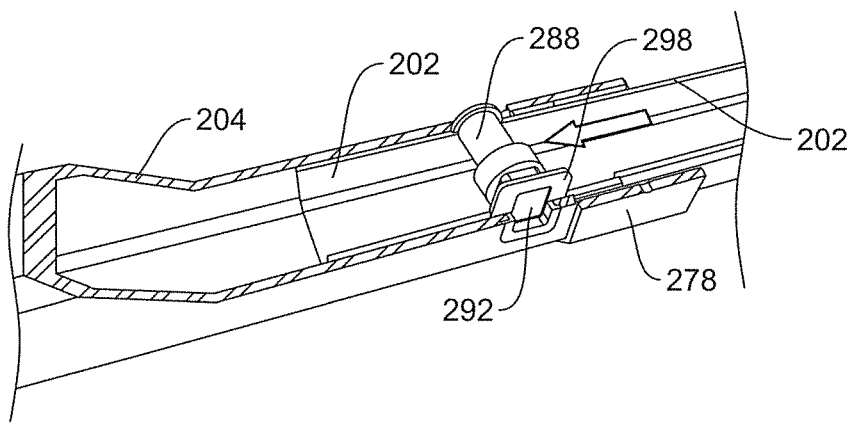
Figure 11C:
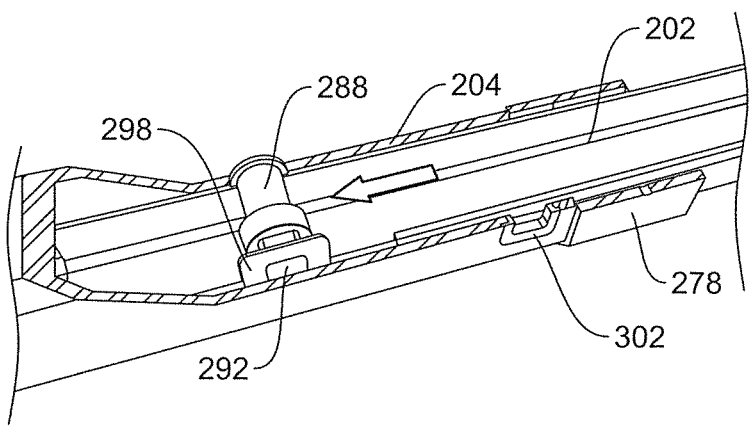

The pivot joint 108 and its components and operation are described in greater detail in connection with FIGS. 10-12 of PCT/CN2017/108552, whose entire disclosure is incorporated by this reference as though set forth fully herein.

Figure 16:
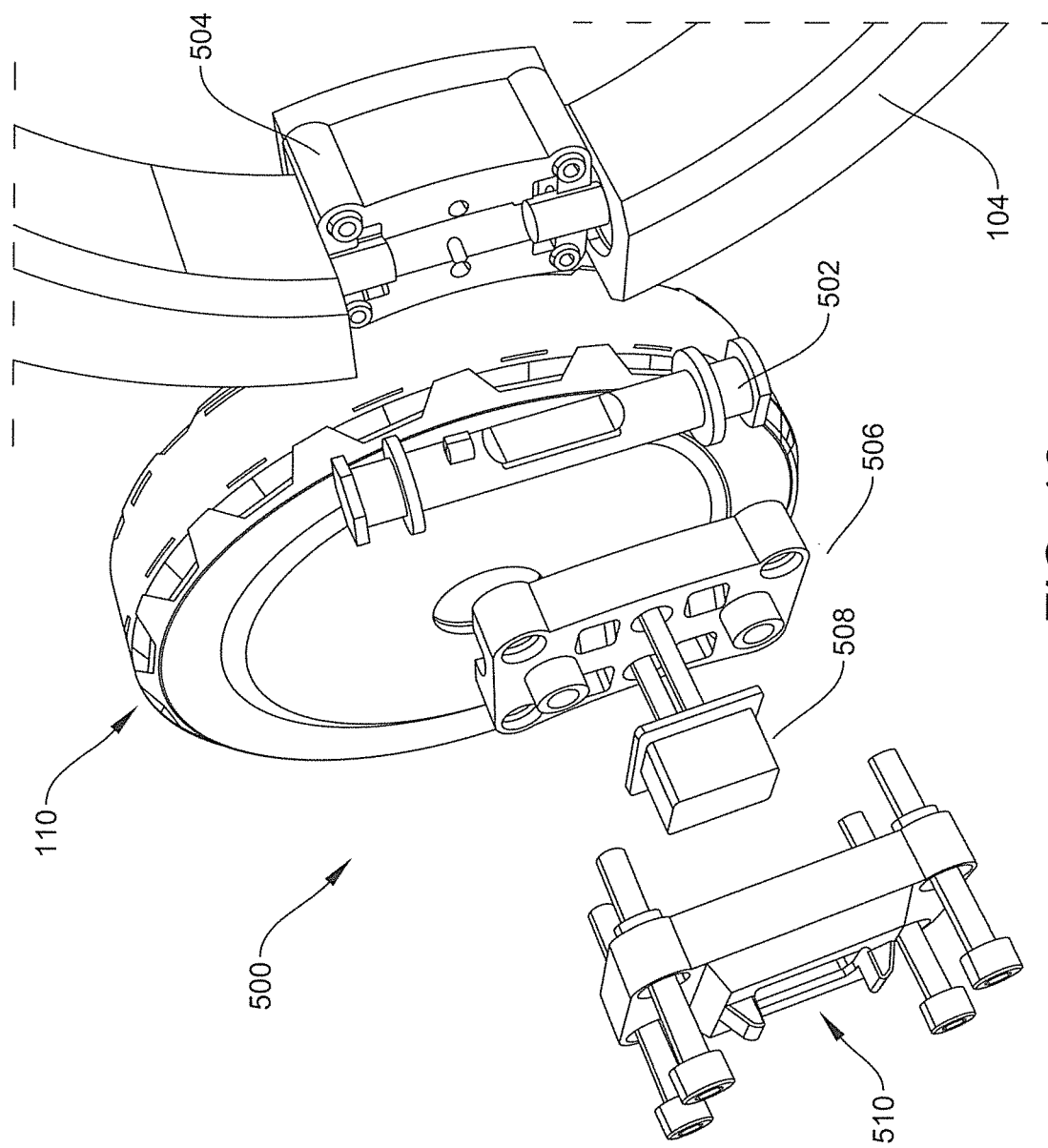
FIG. 16 is an exploded perspective view of a wheel locking system of the foldable vehicle of FIG. 1.
Figure 18:
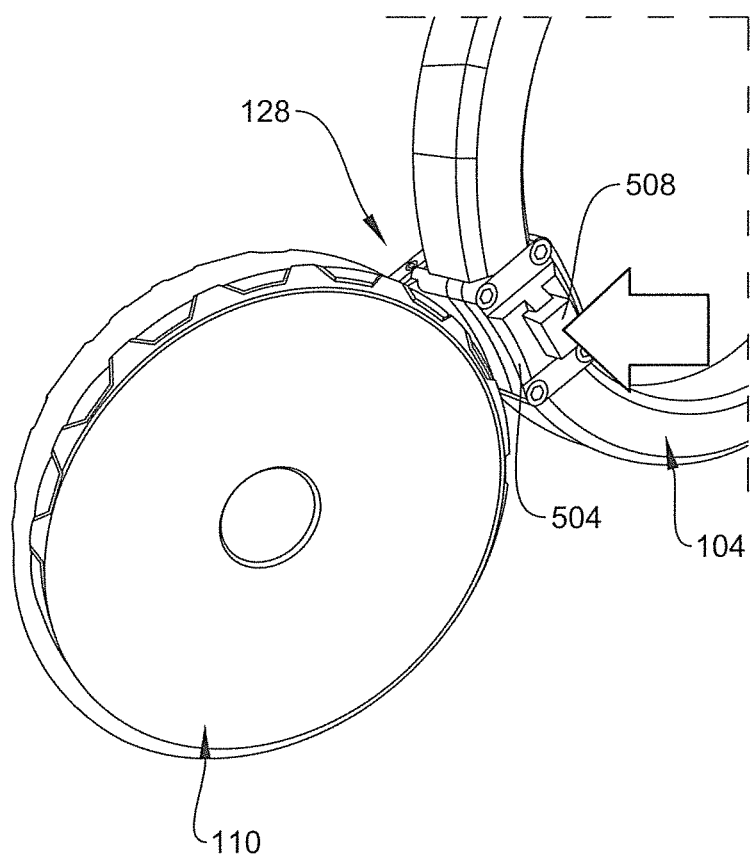
FIGS. 18-19 illustrate how a wheel is folded into a wheel frame.
Figure 19:
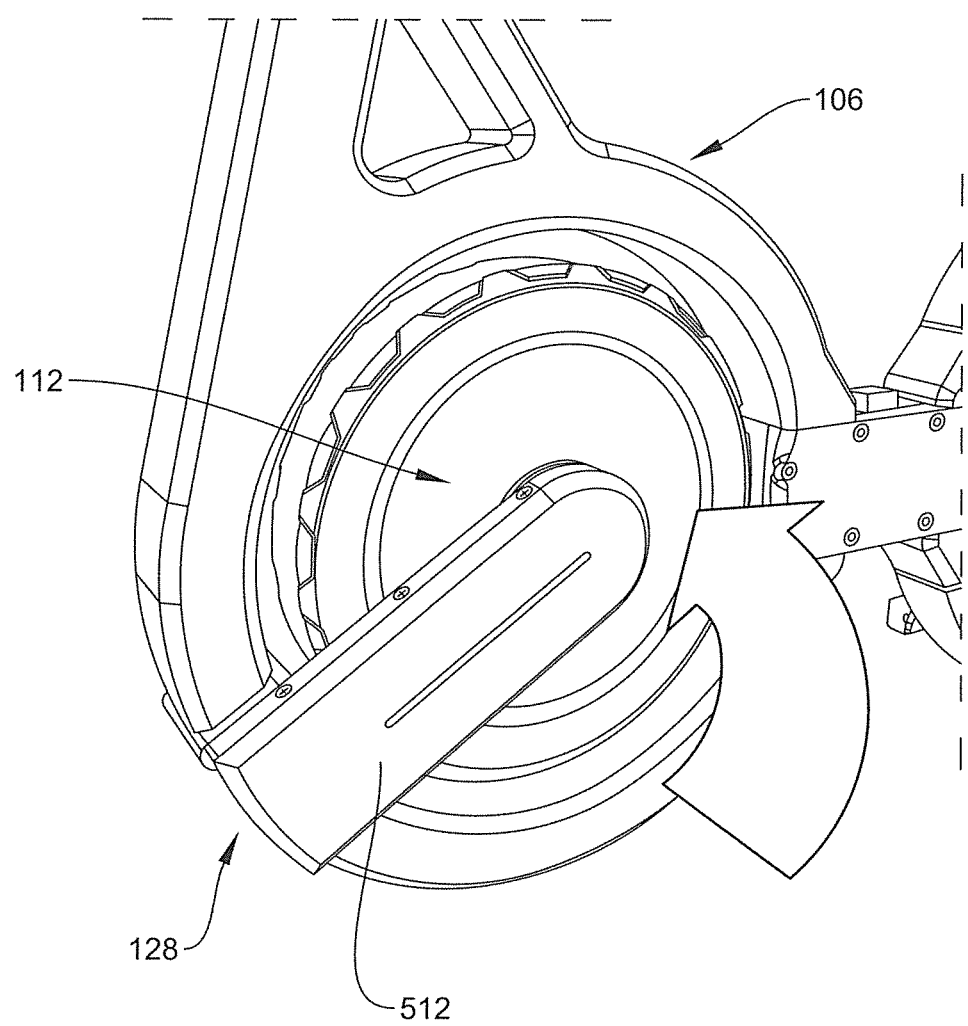
Figure 20:
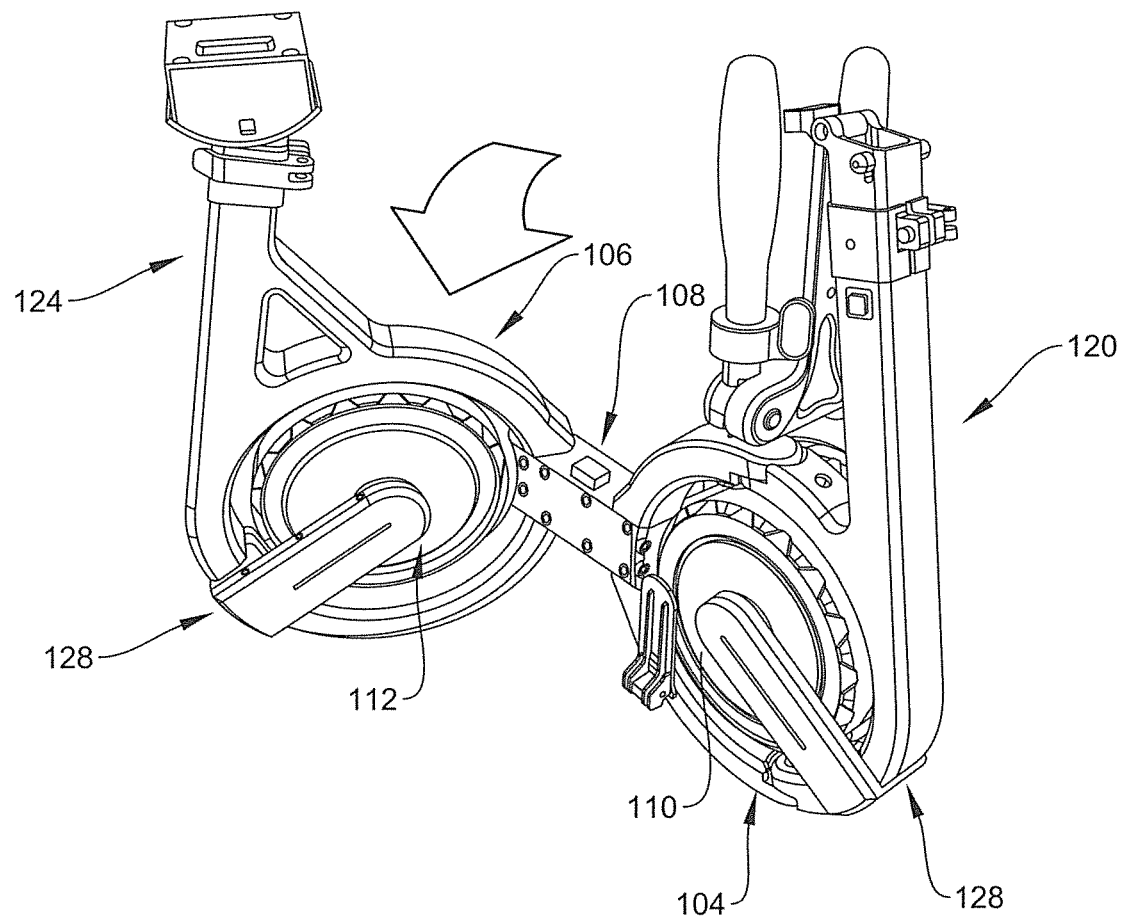
FIG. 20 illustrates how a wheel frame is folded about the central pivot joint.

FIG. 16 illustrates a wheel locking system 500 that allows for each of the wheels 110 and 112 to be locked for use, and to be locked inside the wheel frames 104 and 106 in the storage configuration. Referring also to FIGS. 18-20, the wheel locking system 500 has a locking shaft 502 that is secured for rotation between a box body 504 and a shaft cover 506. A push button 508 is provided between the shaft cover 506 and a button cover 510. A locking assembly (not shown) is provided inside the box body 504. A shaft extends from the push button 508 through the shaft cover 506, the locking shaft 502, and the box body 504, to actuate the locking assembly inside the box body 504. A wheel mounting arm 512 has one end secured to the box body 504, and another end secured to the wheel 110 or 112. When the push button 508 is pushed (see FIG. 18) while the vehicle 100 is in the use configuration, the locking shaft 502 is released for rotation, which allows the box body 504 to be rotated so that the wheel 110 or 112 can be rotated by 180 degrees into the circular opening 116 or 118 inside the wheel frame 104 or 106. When the push button 508 is pushed while the vehicle 100 is in the storage configuration, the locking shaft 502 is again released for rotation, which allows the box body 504 to be rotated so that the wheel 110 or 112 can be rotated by 180 degrees in the other direction to the use configuration shown in FIG. 18. The wheel locking system 500 and its components and operation are described in greater detail in connection with FIGS. 1-4 of PCT/CN2017/108552, whose entire disclosure is incorporated by this reference as though set forth fully herein.

The foldable vehicle 100 can be conveniently folded into a very compact storage configuration. Starting from the use configuration shown in FIG. 1, the user can press the release button 224 on the handlebar assembly 122 to fold the two handlebars 212 downwardly in the manner shown and described in connection with FIGS. 3-6 and 7A-7C. Then, as shown and described in connection with FIGS. 8A and 8B, the slider lock 272 on the pivot joint 206 is pushed down, and this allows the upper tubular section 200 and the handlebar assembly 122 carried thereon to be pivoted by 180 degrees against the central tubular section 202 (see FIG. 6). Next, the locking screw 330 can be loosened, and then the lever 320 pivoted away from the frame 278 (see FIG. 17), to loosen the frame 278 of the sliding joint 208. The user then presses on the button cap 292 (see FIGS. 10 and 11A), and the central tubular section 202 can be slid down into the lower tubular section 204 in the manner described above in connection with FIGS. 9-10 and 11A-11C. The lever 320 can now be pivoted back towards the frame 278, and the locking screw 330 tightened, to secure the retracted central tubular section 202 inside the lower tubular section 204. This accomplishes the folding and locking of the handlebar assembly 122 and the front vertical support 120.

Next, the latch locks 368 are pushed aside to release the removable seat assembly 126 (see FIG. 12A), which is then lifted up (see FIG. 12B). The pivot joint 208 on the rear vertical support 124 is then operated in the same manner as the pivot joint 208 of the front vertical support 120 to slide the upper tubular section 350 into the lower tubular section 352. This accomplishes the compacting of the rear vertical support 124.

The wheels 110 and 112 are now folded. First, the push button 508 for the rear locking assembly 128 is pressed (see FIG. 18), which allows the rear wheel 112 to be folded by 180 degrees to be received inside the circular rear wheel frame 106 (see FIG. 19). Next, the push button 508 for the front locking assembly 128 is pressed (same as for FIG. 18), which allows the front wheel 110 to be folded by 180 degrees to be received inside the circular front wheel frame 104 (same as for FIG. 19). The pedals 132 and 134 can then be flipped up to ensure that the front wheel 110 remains inside the wheel frame 104. This accomplishes the folding of the two wheels 110 and 112.

Finally, the wheel frames 104 and 106 can be folded against each other. The locking button 410 of the central pivot joint 108 is pressed to unlock the joint. The rear wheel frame 106 (and the seat assembly 126 carried thereon) can be pivoted about the central pivot joint 108 (see FIG. 20), and then the front wheel frame 104 (and the handlebar assembly 122 carried thereon) can be pivoted about the central pivot joint 108 to reach the configuration shown in FIG. 21, where the vehicle 100 has been completely folded. In this folded storage configuration, the vehicle 100 is compact enough to be stored inside a backpack and then carried around conveniently by the user. The seat assembly 126 can be stored in a separate after-market backpack that can be provided with the vehicle 100 (or sold separately), and used to store and transport the folded vehicle 100 together with the detached seat assembly 126 and a biker's helmet.

Figure 21:
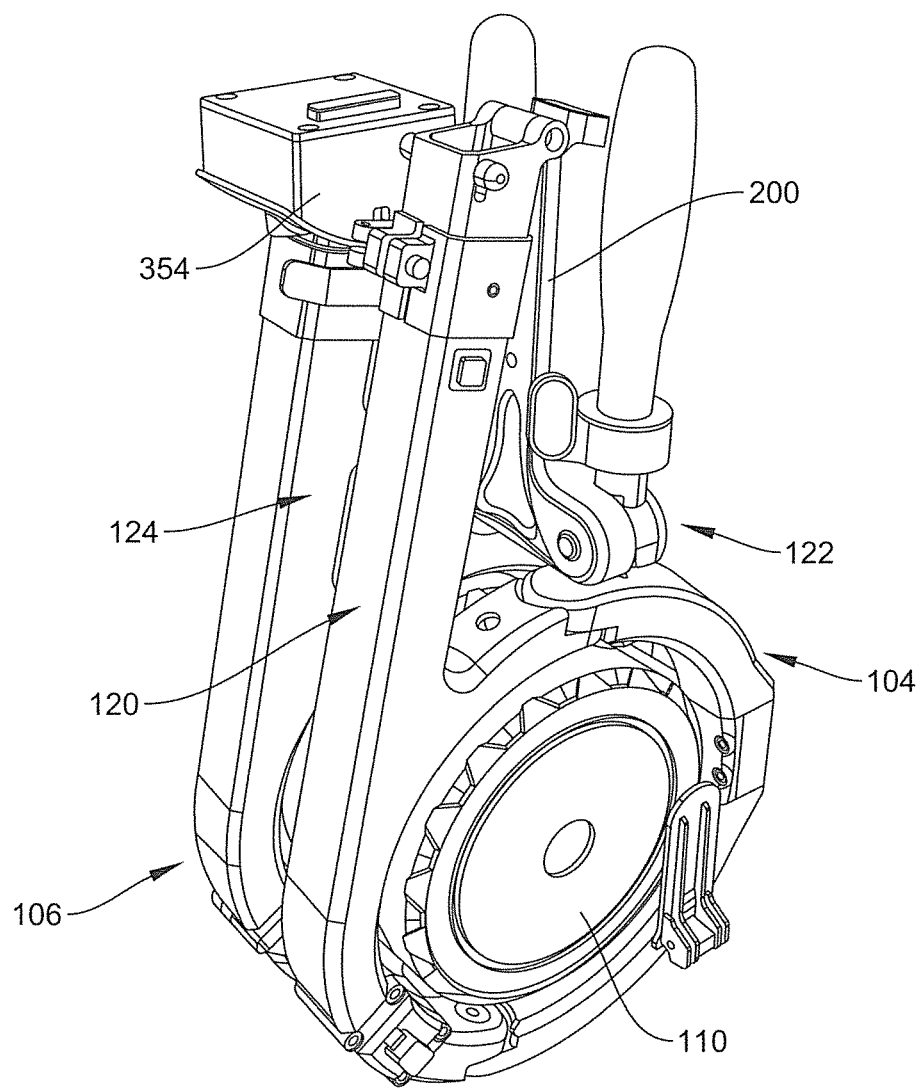
FIG. 21 illustrates the foldable vehicle of FIG. 1 in its folded storage configuration.

From the folded storage configuration shown in FIG. 21, the vehicle 100 can be deployed and unfolded for use by reversing the steps described above. First, the locking button 410 can be pressed to unfold the wheel frames 104 and 106, and then the push buttons 508 for the locking assemblies 128 can be pressed to pivot the wheels 110 and 112 out of the wheel frames 104 and 106, respectively. The sliding joint 208 for the rear vertical support 124 is opened to slide the upper tubular section 350 up, and then the seat assembly 126 is latched on to the seat support 354. Next, the sliding joint 208 for the front vertical support 120 is opened to slide the central tubular section 202 up. The upper tubular section 200 is pivoted over the pivot joint 206 to lock it in place for use with respect to the central tubular section 202. Finally, the release button 224 is pressed to allow the handlebars 212 to be unfolded. The vehicle 100 is now ready for use.

Thus, the present invention provides a foldable vehicle 100 that can be very quickly, conveniently and easily folded for storage, and unfolded and deployed for use. The folded vehicle 100 shown in FIG. 21 can even be compact enough to be stored in a conventional backpack. The various folding, sliding and locking mechanisms and joints are all simple in construction, and easy to use. As a result, the folding vehicle 100 of the present invention is able to meet the objective of providing a portable vehicle that can be used for urban short-distance travel, and which is easy to carry around and to store.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for folding a foldable vehicle, comprising:
   providing a vehicle comprising:
      a front wheel frame having a front wheel pivotably connected thereto, the front wheel frame having a front circular opening and two pivotable pedals;
      a rear wheel frame having a rear wheel pivotably connected thereto, the rear wheel frame having a rear circular opening;
      a pivot joint that connects the front wheel frame and the rear wheel frame;
      a front vertical support extending from the front wheel frame and having a handlebar assembly pivotably secured to the front vertical support; and
      a rear vertical support extending from the rear wheel frame and having a seat assembly removably secured to the rear vertical support;
   folding the front wheel inside the front circular opening of the front wheel frame and pivoting the two pedals to secure the front wheel inside the front circular opening;
   folding the rear wheel inside the rear circular opening of the rear wheel frame;
   pivoting the front wheel frame and the rear wheel frame against each other via the pivot joint;
   pivoting the handlebar assembly against the front vertical support and positioning the handlebar assembly adjacent the front wheel frame and the rear wheel frame; and
   removing the seat assembly from the rear vertical support.

2. The method of claim 1, further including:
   providing the front vertical support with a lower tubular section, a central tubular section slidably connected to the lower tubular section, and an upper tubular section pivotably connected to the central tubular section; and
   securing the handlebar assembly to the upper tubular section.

3. The method of claim 1, further including:
   providing the rear vertical support with a rear lower tubular section, and a rear upper tubular section slidably connected to the rear lower tubular section, with a seat support secured to the rear upper tubular section; and
   removably connecting the seat assembly with the seat support.

4. The method of claim 1, further including a front pivoting locking assembly that pivotably connects the front wheel to the front wheel frame, with the front pivoting locking assembly locking the front wheel in one of two positions, a first position where the front wheel is retained inside the front circular opening, and a second position where the front wheel is deployed for use.

5. The method of claim 4, further including a rear pivoting locking assembly that pivotably connects the rear wheel to the rear wheel frame, with the rear pivoting locking assembly locking the rear wheel in one of two positions, a first position where the rear wheel is retained inside the rear circular opening, and a second position where the rear wheel is deployed for use.

6. The method of claim 2, further including slidably connecting the central tubular section to the lower tubular section by a sliding joint, and pivotably connecting the upper tubular section to the central tubular section by a pivot joint.

7. The method of claim 3, further including slidably connecting the rear upper tubular section to the rear lower tubular section by a sliding joint.

8. The method of claim 1, wherein the handlebar assembly comprises a handlebar housing having first and second opposite sides, and first and second handlebars extending from the first and second sides, respectively, of the handlebar housing, and further including pivoting the handlebars with respect to the handlebar housing when the handlebar assembly is folded.

9. The method of claim 1, wherein the front wheel frame further includes a steering mechanism, a front segment and a rear segment, and wherein the steering mechanism is formed by pivotably connecting the front and rear segments.

10. The method of claim 1, further including providing the seat assembly with a power supply.

11. The method of claim 1, further including providing the seat assembly with a main switch.

12. The method of claim 1, further including:
   providing a backpack;
   retaining the folded vehicle inside the backpack.

* * * * *